United States Patent
Park et al.

(10) Patent No.: US 12,468,091 B2
(45) Date of Patent: Nov. 11, 2025

(54) SYSTEM FOR INTEGRATED PHOTONIC NOTCH FILTER

(71) Applicant: Psiquantum, Corp., Palo Alto, CA (US)

(72) Inventors: Bryan Park, Campbell, CA (US);
Koustuban Ravi, Oakland, CA (US);
Eric Dudley, Sacramento, CA (US);
Mihai Dorian Vidrighin, Palo Alto, CA (US); Mehdi Jadidi, San Mateo, CA (US)

(73) Assignee: Psiquantum, Corp., Palo Alto, CA (US)

( * ) Notice: Subject to any disclaimer, the term of this patent is extended or adjusted under 35 U.S.C. 154(b) by 215 days.

(21) Appl. No.: 18/122,392

(22) Filed: Mar. 16, 2023

(65) Prior Publication Data
US 2024/0310582 A1  Sep. 19, 2024

(51) Int. Cl.
*G02B 6/293* (2006.01)
*G02B 6/12* (2006.01)
*G02F 1/35* (2006.01)

(52) U.S. Cl.
CPC ..... *G02B 6/29355* (2013.01); *G02B 6/29389* (2013.01); *G02B 2006/12109* (2013.01); *G02F 1/3536* (2013.01)

(58) Field of Classification Search
CPC ............ G02B 6/29355; G02B 6/29389; G02B 2006/12109; G02F 1/3536
See application file for complete search history.

(56) References Cited

U.S. PATENT DOCUMENTS

| | | | |
|---|---|---|---|
| 10,379,420 B1 | 8/2019 | Wang | |
| 11,105,980 B1 * | 8/2021 | Hu | ...... H04J 14/0209 |
| 2005/0169630 A1 * | 8/2005 | Takiguchi | ...... G02B 6/29395 398/53 |
| 2023/0119450 A1 * | 4/2023 | Lee | ...... G02B 6/12007 385/37 |

FOREIGN PATENT DOCUMENTS

| | | |
|---|---|---|
| WO | 9749248 A1 | 12/1997 |
| WO | 2018106765 A1 | 6/2018 |

OTHER PUBLICATIONS

PCT/US2024/019958, "International Search Report and Written Opinion", Jul. 30, 2024, 10 pages.
PCT/US2024/019958, "Invitation to Pay Additional Fees and, Where Applicable, Protest Fee", May 10, 2024, 2 pages.
PCT/US2024/019958, "International Preliminary Report on Patentability", Sep. 25, 2025, 7 pages.

* cited by examiner

*Primary Examiner* — Michael Stahl
(74) *Attorney, Agent, or Firm* — Kilpatrick Townsend & Stockton LLP

(57) ABSTRACT

A notch filter circuit includes a wavelength demultiplexer, a first pump rejection filter coupled to the wavelength demultiplexer, and a second pump rejection filter coupled to the wavelength demultiplexer. The notch filter circuit also includes a first notch filter arm coupled to the first pump rejection filter and including a first chain of asymmetric Mach-Zehnder interferometers (MZIs) and a second notch filter arm coupled to the second pump rejection filter and including a second chain of asymmetric MZIs.

20 Claims, 15 Drawing Sheets

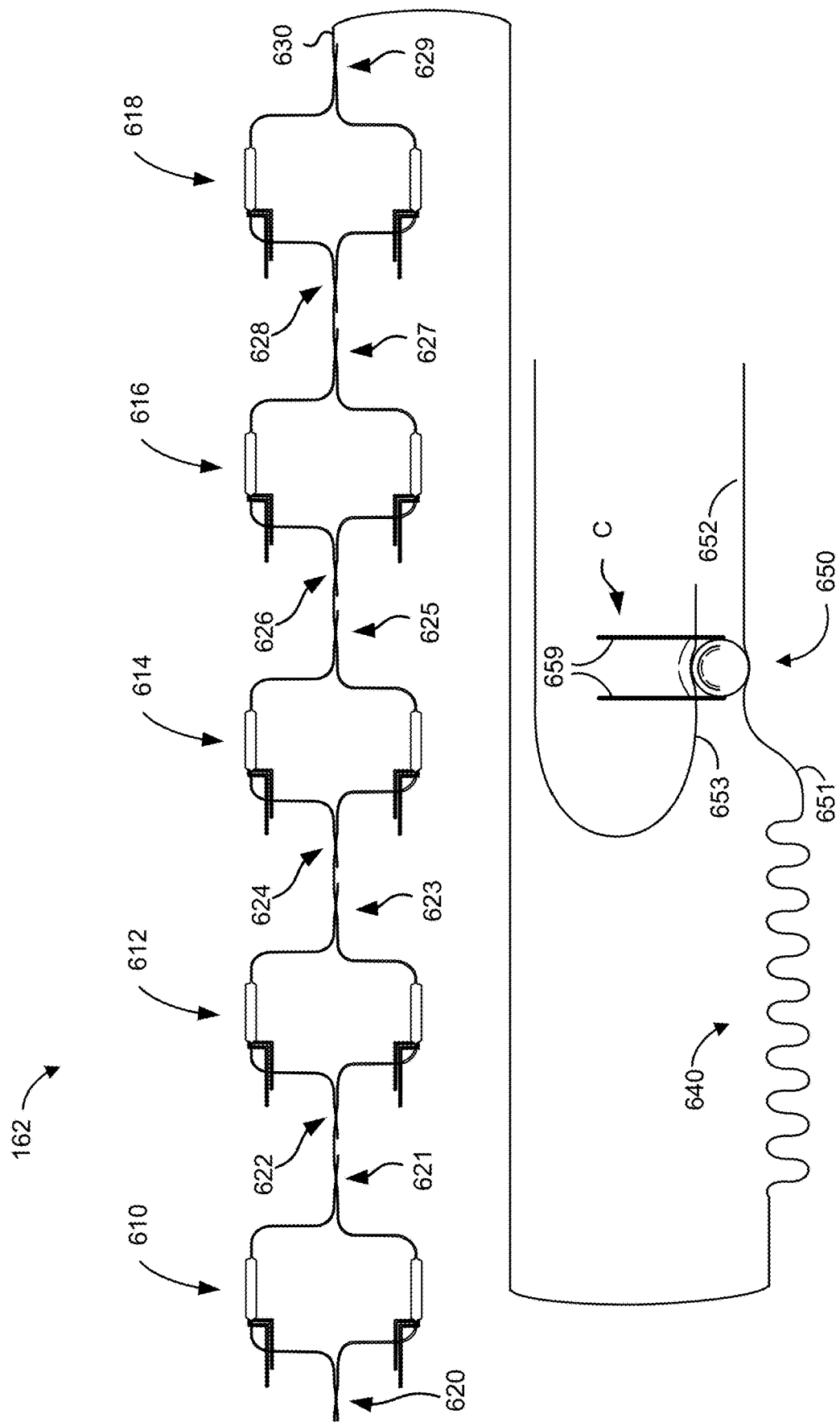

SYSTEM FOR INTEGRATED PHOTONIC NOTCH FILTER

BACKGROUND OF THE INVENTION

Currently, there are a wide variety of devices that utilize optical circuits for communications and/or computations. Many optical circuits rely on one or more optical filter elements to filter out undesirable optical frequencies, so that an optical frequency range of interest can be isolated.

Broadband notch filtering is generally achieved using dielectric thin-film stacks. Despite the progress made in the area of optical filters, there is a need in the art for improved methods and systems related to optical filters.

SUMMARY OF THE INVENTION

The described embodiments relate generally to optical filter devices. More particularly, the present embodiments relate to methods and systems for spectrally filtering an optical signal produced by a spontaneous four-wave mixing, single photon source. The integrated photonic broadband and notch filters described herein are applicable to a variety of optical signal processing and optical communications technologies.

According to an embodiment of the present invention, a notch filter circuit is provided. The notch filter circuit includes a wavelength demultiplexer, a first pump rejection filter coupled to the wavelength demultiplexer, and a second pump rejection filter coupled to the wavelength demultiplexer. The notch filter circuit also includes a first notch filter arm coupled to the first pump rejection filter and including a first chain of asymmetric Mach-Zehnder interferometers (MZIs) and a second notch filter arm coupled to the second pump rejection filter and including a second chain of asymmetric MZIs.

According to another embodiment of the present invention, a spectral filter is provided. The spectral filter includes a wavelength demultiplexer having a first output and a second output and a signal channel pump rejection filter coupled to a first output. The spectral filter also includes a herald channel pump rejection filter coupled to the second output and a first chain of asymmetric Mach-Zehnder interferometers (MZIs) coupled to the signal channel pump rejection filter. Each of the asymmetric MZIs in the first chain of asymmetric MZIs is characterized by a decreasing free spectral range. The spectral filter further includes a second chain of asymmetric MZIs coupled to the herald channel pump rejection filter.

According to a particular embodiment of the present invention, a method of spectrally filtering an optical signal produced by a spontaneous four-wave mixing, single photon source is provided. The method includes receiving the optical signal. The optical signal includes pump light, signal channel light, and herald channel light. The method also includes splitting the optical signal into a signal arm signal and a herald arm signal, removing a first portion of the pump light from the signal arm signal, and removing a second portion of the pump light from the herald arm signal. The method further includes removing signal channel resonances from the signal arm signal and removing herald channel resonances from the herald arm signal.

Numerous benefits are achieved by way of the present invention over conventional techniques. For example, embodiments of the present invention provide a set of filters that are able to select a single mode produced by a resonator-based photon source and reject the sideband resonances and stochastic noise present as sources of noise. Additionally, embodiments of the present invention provide a narrowband notch filter circuit that rejects both the broadband noise and the sideband noise, while allowing the desired, narrow band, single photon to pass through the notch filter. These and other embodiments of the present invention, along with many of their advantages and features, are described in more detail in conjunction with the text below and corresponding figures.

BRIEF DESCRIPTION OF THE DRAWINGS

FIG. 6A is a simplified schematic diagram illustrating a herald channel notch filter according to an embodiment of the present invention.

DETAILED DESCRIPTION OF SPECIFIC EMBODIMENTS

Some embodiments of the present invention relate to a narrow band optical filter suitable for application in photonic quantum computing architectures. Merely by way of example, embodiments of the present invention provide an optical filter characterized by a narrow passband, e.g., a bandwidth of about 2 nm, that can be utilized in conjunction with signal photons and/or herald photons. In a particular embodiment, an optical filter with a 2 nm passband passes signal photons and herald photons while suppressing wavelengths outside the 2 nm passband (e.g., over a range of hundreds of nanometers (e.g., from 600 nm to 2 μm)) by 50 dB or more.

The inventors have determined that single photons generated in amorphous materials, for example, silicon nitride or optical fibers, are accompanied by broadband, non-linear noise generated concurrently by the same non-linear processes that create single photons. This noise, which can be stochastic noise and includes Raman noise, has the potential to degrade the performance of a photonic quantum system. Additionally, single photons generated in a resonant cavity (e.g., a micro-ring resonator) are produced in a frequency comb that spans a large wavelength range. Thus, when utilized in conjunction with resonator-based photon sources, the amplitude of the frequency comb varies as a function of wavelength due to phase-matching conditions present in the resonators. For many quantum computing systems, it is desirable to select a single mode of the resonator and reject all of the sideband resonances and stochastic noise as sources of noise. Accordingly, embodiments of the present invention provide a narrowband notch filter circuit that rejects both the broadband noise and the sideband noise, while allowing the desired, narrow band, single photon to pass through the notch filter. As a result, embodiments of the present invention are particularly suitable for use in quantum computing systems, including single photon systems, that are characterized by a low signal to noise ratio.

Figure 1:
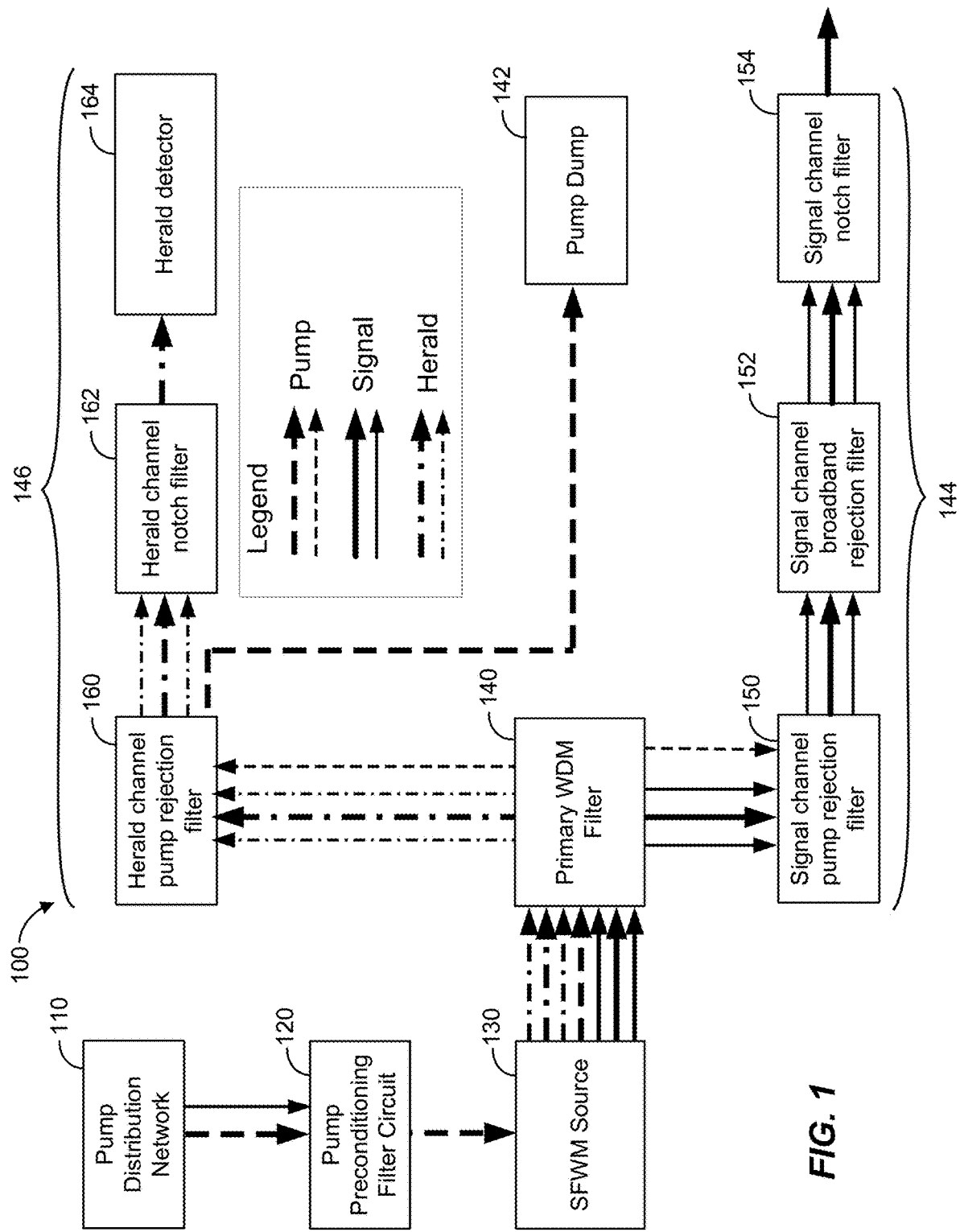
FIG. 1 is a simplified schematic diagram illustrating a notch filter circuit according to an embodiment of the present invention.

FIG. 1 is a simplified schematic diagram illustrating a notch filter circuit according to an embodiment of the present invention. As described more fully below, notch filter circuit 100 includes a number of component filters, which can incorporate directional couplers, a network of Mach-Zehnder Interferometers (MZIs) with non-uniform free spectral ranges (FSRs) and dispersive couplers, and a ring notch filter, which can be implemented using a phase-matching filter.

The inventors have determined that the generation of signal photons produces a comb-like spectrum. During quantum computations, a single line from this comb-like spectrum is selected. This selection is implemented using the notch filter circuit 100 illustrated in FIG. 1, which implements a very narrowband filter (e.g., with a passband on the order of a 1.8 nm). Thus, notch filter circuit 100 illustrated in FIG. 1 can be integrated with a photon source, for example, photon sources as described in commonly assigned U.S. Pat. No. 10,372,014, the disclosure of which is hereby incorporated by reference in its entirety for all purposes. Signal photons and/or herald photons produced by the source can be input into and filtered using the notch filter circuit 100 to provide photons suitable for single photon processing.

Referring to FIG. 1, pump preconditioning filter circuit 120 receives light including the pump and signal channel from pump distribution network 110. The signal channel corresponds to noise at the signal channel wavelength and nearby wavelengths that is generated in the fiber utilized in the pump distribution network 110. After passing through pump preconditioning filter circuit 120, the pump light is provided to spontaneous four wave mixing (SFWM) source 130. Light produced by SFWM source 130 includes light corresponding to the pump, the signal channel, and the herald channel. As described more fully herein, notch filter circuit 100 filters light produced by SFWM source 130 to separate the signal channel and the herald channel from the pump light.

Figure 4A:
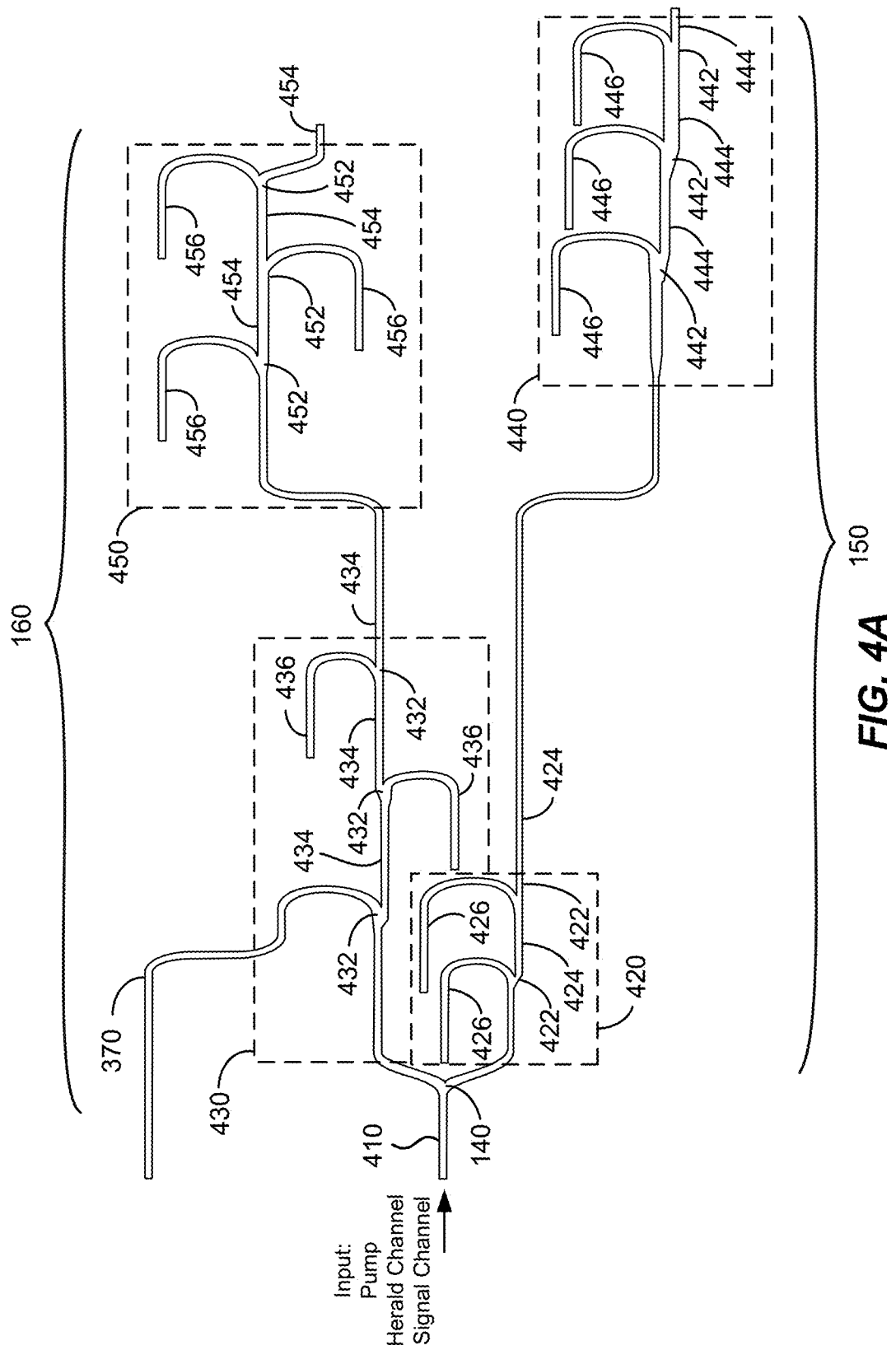
FIG. 4A is a simplified plan view diagram illustrating a primary wavelength demultiplexer filter, a signal channel pump rejection filter, and a herald channel pump rejection filter according to an embodiment of the present invention.
Figure 5A:
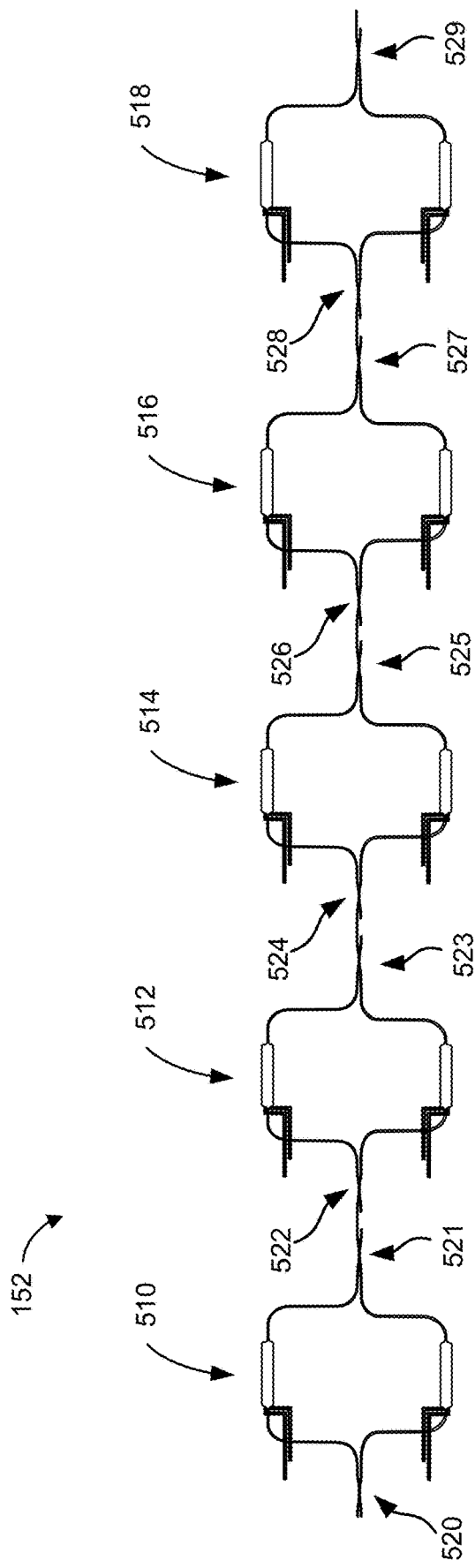
FIG. 5A is a simplified schematic diagram illustrating a signal channel broadband rejection filter according to an embodiment of the present invention.
Figure 5B:
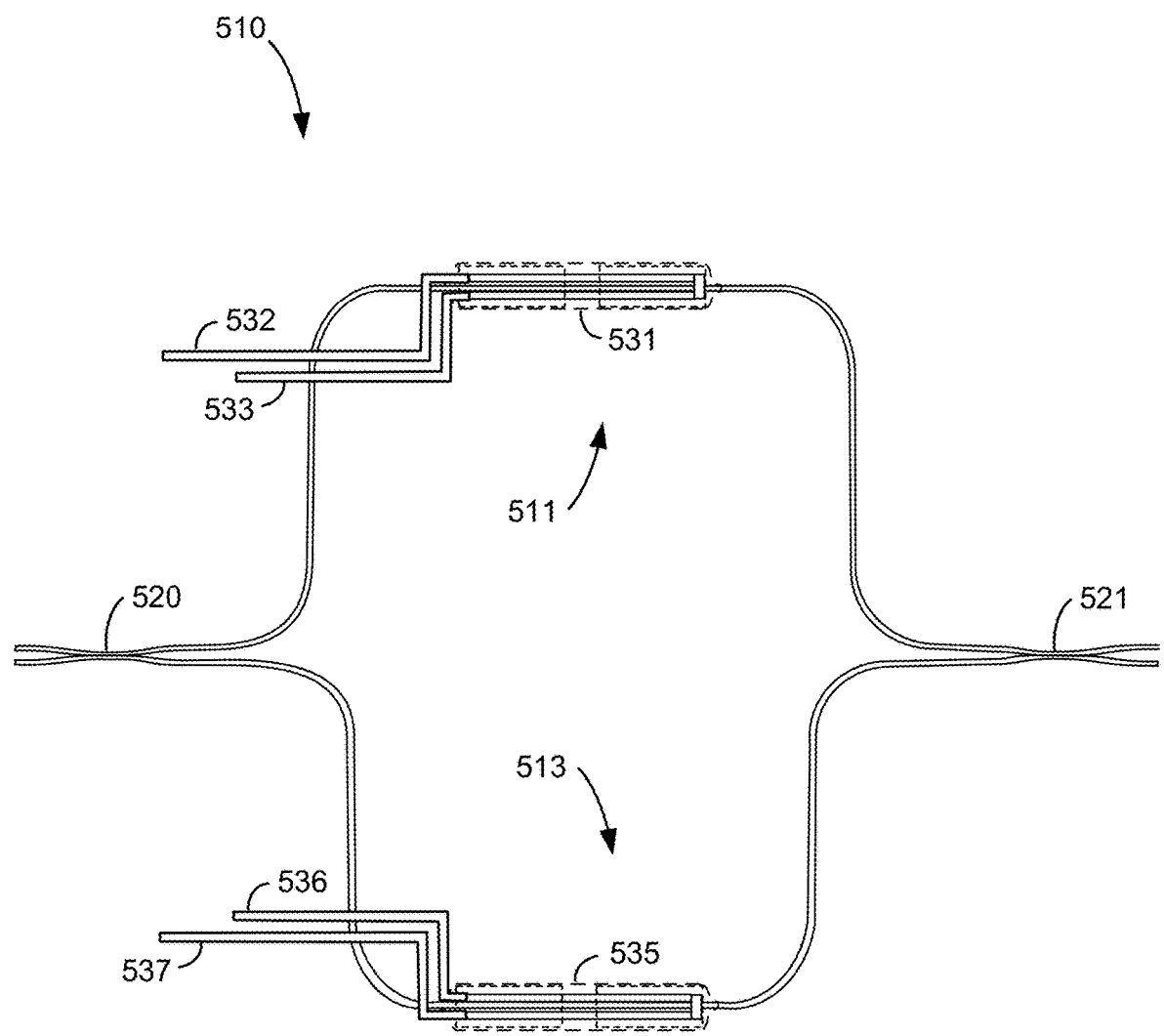
FIG. 5B is a simplified schematic diagram of a first asymmetric Mach-Zehnder interferometer as illustrated in FIG. 5A according to an embodiment of the present invention.
Figure 5C:
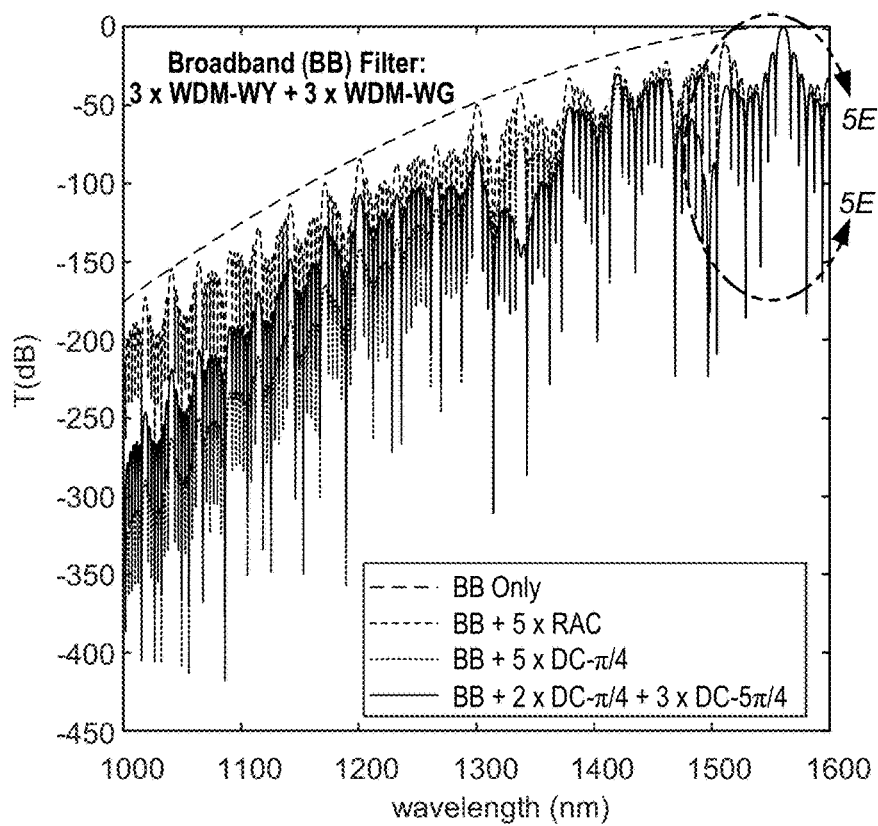
FIG. 5C is a plot illustrating the transmission profile for filter designs including the signal channel broadband rejection filter illustrated in FIG. 5A according to an embodiment of the present invention.
Figure 5D:
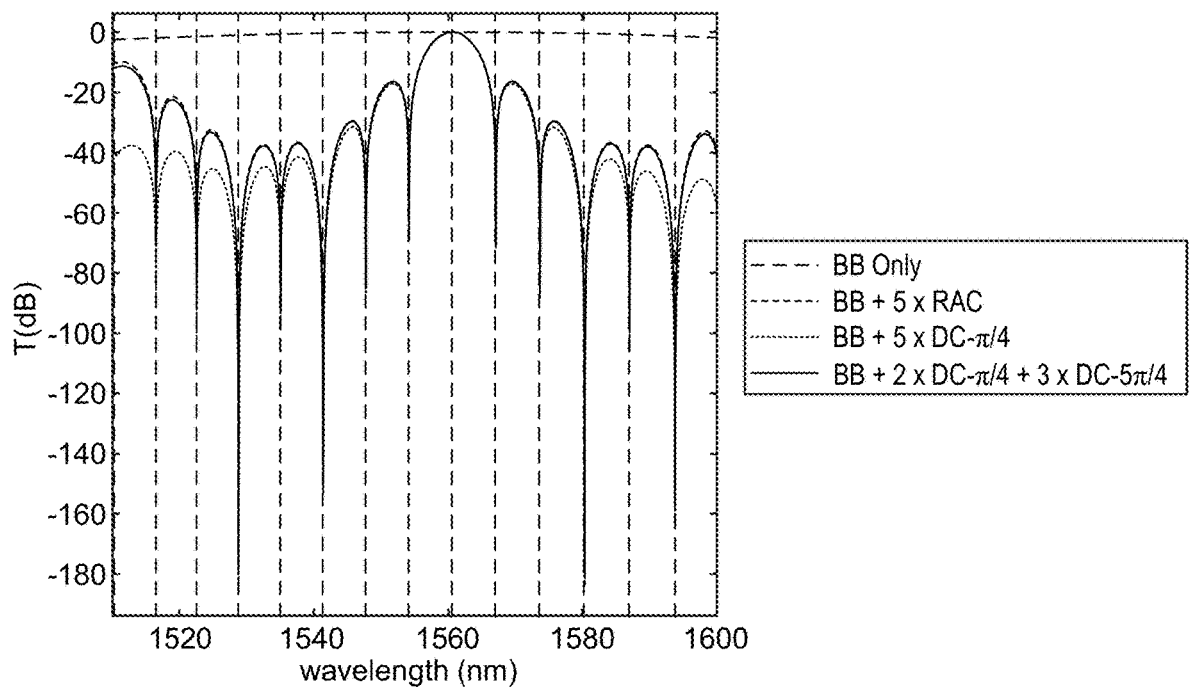
FIG. 5D is a plot illustrating a magnified portion of the transmission profile illustrated in FIG. 5C for the signal channel broadband rejection filter illustrated in FIG. 5A.
Figure 5E:
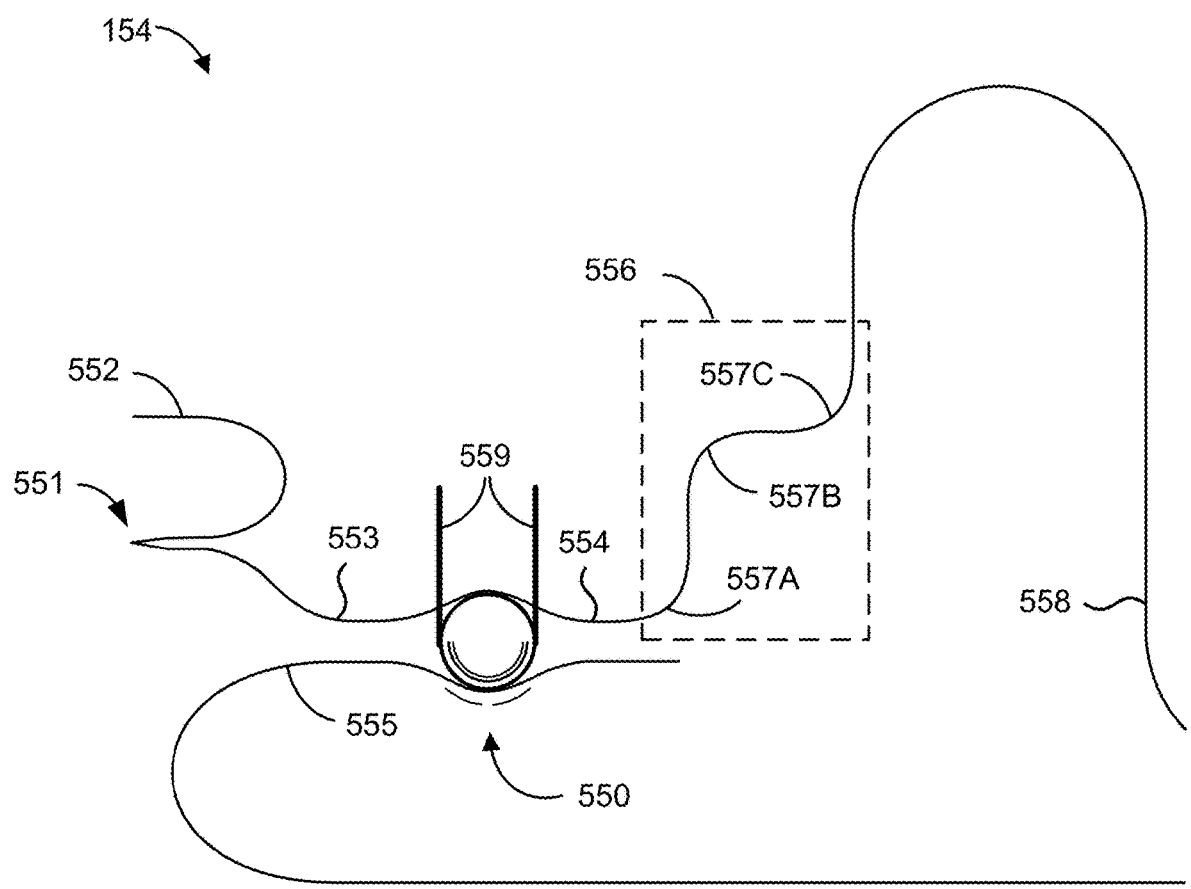
FIG. 5E is a simplified schematic diagram illustrating a signal channel notch filter according to an embodiment of the present invention.

Notch filter circuit 100 includes primary wavelength demultiplexer filter 140 and signal channel pump rejection filter 150, described more fully in relation to FIG. 4A; signal channel broadband rejection filter 152, described more fully in relation to FIG. 5A; and signal channel notch filter 154, described more fully in relation to FIG. 5E. Light in the signal channel is provided as an output of notch filter circuit 100. Additionally, notch filter circuit 100 includes herald channel pump rejection filter 160, described more fully in relation to FIG. 4A and herald channel notch filter 162, described more fully in relation to FIG. 6A. After filtering by herald channel pump rejection filter 160 and herald channel notch filter 162, filtered light in the herald channel is provided to herald detector 164.

Thus, as illustrated in FIG. 1, a notch filter circuit 100 is provided that includes a wavelength demultiplexer (WDM) (in the form of primary wavelength demultiplexer filter 140 optically coupled to a first notch filter arm 144 that includes a first chain of asymmetric MZIs implemented in signal channel broadband rejection filter 152 and a second notch filter arm 146 that includes a second chain of asymmetric MZIs implemented in herald channel notch filter 162. As described more fully herein, pump preconditioning filter circuit 120, primary wavelength demultiplexer filter 140, first signal channel/pump rejection filter 420, second signal channel/pump rejection filter 440, first herald channel/pump rejection filter 430, and second herald channel/pump rejection filter 450 can utilize straight directional couplers and signal channel notch filter 154 can utilize a ring notch filter (e.g., a phase-matching filter). Primary wavelength demultiplexer filter 140 can be characterized by a bandwidth on the order of 200 GHz. In some embodiments, asymmetric MZIs with adiabatically spaced free-spectral ranges (FSRs) can be utilized as components of signal channel broadband rejection filter 152 and herald channel notch filter 162. As described more fully in relation to FIG. 5A, dispersive couplers can be utilized to optically couple adjacent asymmetric MZIs. Each of the components can exhibit at least partial tolerance to waveguide width, waveguide height, and refractive index variations, enabling a robustness to fabrication errors not available using conventional techniques.

It should be noted that although signal channel broadband rejection filter 152 is discussed in terms of providing a broadband filter response, it will be appreciated that signal channel broadband rejection filter 152 also provides notch filtering at predetermined wavelengths. Thus, signal channel broadband rejection filter 152 can be considered as a signal channel broadband/notch rejection filter since filtering functionality is not limited to broadband filtering. One of ordinary skill in the art would recognize many variations, modifications, and alternatives.

Figure 2:
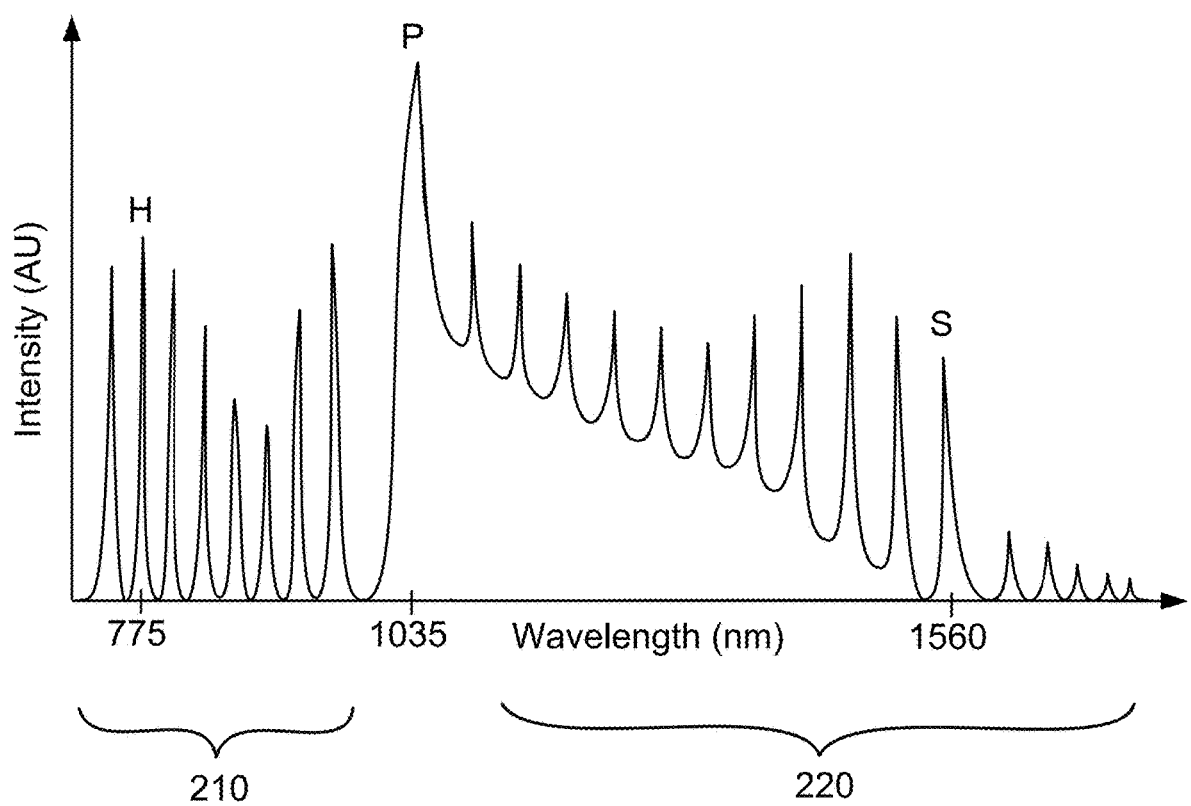
FIG. 2 is a plot illustrating the spectral profile of an optical signal produced by a single photon source according to an embodiment of the present invention.

FIG. 2 is a plot illustrating the spectral profile of an optical signal produced by a single photon source according to an embodiment of the present invention. The spectral profile includes region 210 in the vicinity of the herald channel (e.g., herald wavelength (H) of 775 nm) and region 220 in the vicinity of the signal channel (e.g., signal wavelength (S) of 1560 nm). Pump light is illustrated in the spectral profile at the pump wavelength (P), which is on the order of 1035 nm. As illustrated in FIG. 2, the spectral profile of the optical signal produced by the single photon source includes a number of components including DC background noise in region 220 that decreases in amplitude as a function of wavelength, resulting in a comb of resonances in region 220 with a wavelength-dependent amplitude.

Figure 3:
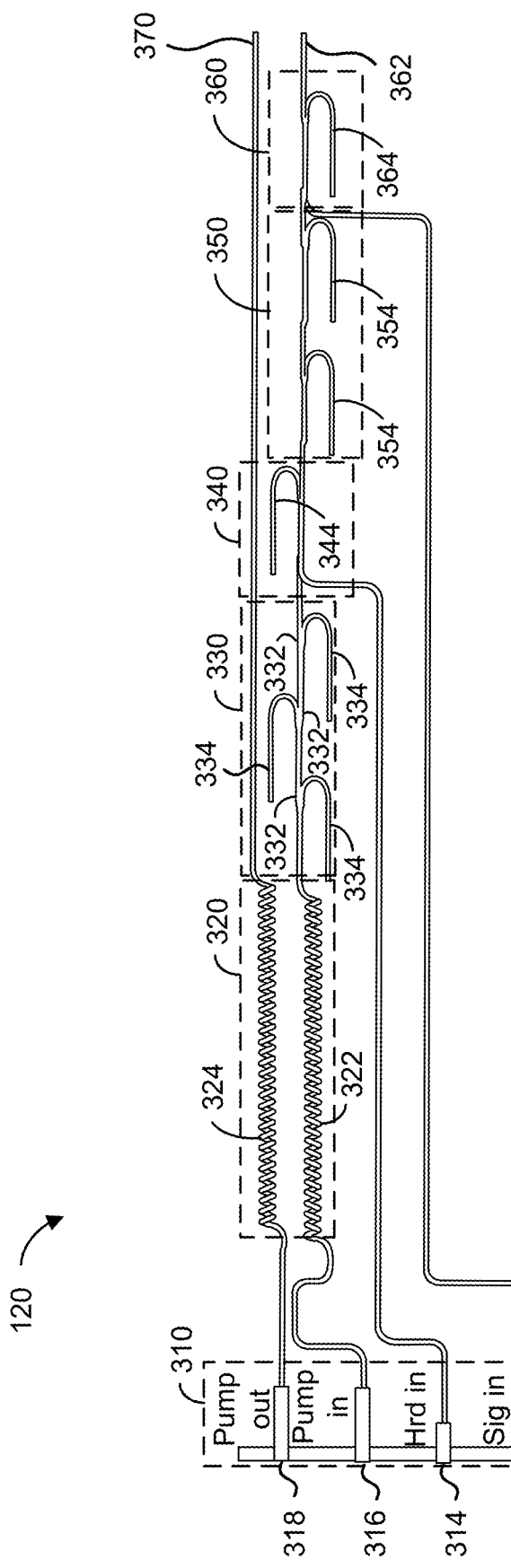
FIG. 3 is a simplified schematic diagram illustrating a pump preconditioning filter circuit according to an embodiment of the present invention.

FIG. 3 is a simplified schematic diagram illustrating a pump preconditioning filter circuit according to an embodiment of the present invention. As described below, pump preconditioning filter circuit 120 filters the pump light before the pump light is injected into SFWM source 130. As illustrated in FIG. 3, pump preconditioning filter circuit 120 includes optical input/output (I/O) module 310, which includes a signal input port 312, herald input port 314, pump input port 316, and pump output port 318. The pump signal is received at pump input port 316 and is directed to a first leg 322 of pump polarization band filter 320. In some embodiments, pump polarization is utilized during alignment processes. Accordingly, first leg 322 of pump polarization band filter 320 is provided as a filter that passes light having a transverse electric field (TE) polarization. As a result, passing through first leg 322 of pump polarization band filter 320, which can be implemented as a series of serpentine waveguide bends, the pump light having a transverse magnetic field (TM) polarization is removed. In addition, long wavelength light (e.g., light at wavelengths in the range of 1.2 µm) and higher order modes are removed by first leg 322 of pump polarization band filter 320.

After passing through first leg 322 of pump polarization band filter 320, the polarization filtered pump signal is directed to pump polarizing beam splitter filter 330 to remove additional light having a TM polarization. Pump polarizing beam splitter filter 330 utilizes a series of 1×2 directional couplers 332 operating as polarizing beam splitters to direct the light having the TM polarization into coupled waveguides 334, which are terminated, while passing light having the TE polarization, thereby removing pump light having the TM polarization.

Referring to FIG. 3, in order to perform circuit calibration and testing, light corresponding to the herald channel can be input at herald input port 314 and provided to herald/pump wavelength demultiplexer 340. Herald/pump wavelength demultiplexer 340 also receives the filtered pump signal output by pump polarizing beam splitter filter 330. Herald/pump wavelength demultiplexer 340 is implemented in this embodiment as a direction coupler that passes the herald channel, thereby joining the herald channel with the pump light. Additionally, some pump light is coupled onto coupled waveguide 344, which is terminated. By combining herald channel light input at herald input port 314 with the pump light, testing can be performed in conjunction with the herald light, independent of herald generation using a photon pair source. Accordingly, herald/pump wavelength demultiplexer 340 can be utilized in conjunction with herald input port 314 to provide a tap in for downstream optical components.

The filtered pump signal output from herald/pump wavelength demultiplexer 340 is received at Raman noise filter 350, which removes light in the vicinity of the signal channel wavelength generated in the pump distribution network, for example, by fibers utilized in the pump distribution network. In operation, Raman noise filter 350 crosses the pump light (and the herald channel during testing as discussed above) and crosses the signal channel into coupled waveguides 354, which are terminated. In some embodiments, the Raman rejection level for noise in the vicinity of the signal channel wavelength generated in the fiber of the pump distribution network is >30 dB, which can be desirable in order to achieve safety goals.

After passing through Raman noise filter 350, the output of Raman noise filter 350 is received at signal/pump wavelength demultiplexer 360. In a manner similar to the use of herald/pump wavelength demultiplexer 340, in order to perform circuit calibration and testing, light corresponding to the signal channel can be input at signal input port 312 and provided to signal/pump wavelength demultiplexer 360. Signal/pump wavelength demultiplexer 360 also receives the filtered pump signal output by Raman noise filter 350. Signal/pump wavelength demultiplexer 360 is implemented in this embodiment as a direction coupler that passes the signal channel, thereby joining the signal channel with the pump light. Additionally, some pump light is coupled onto coupled waveguide 364, which are terminated. By combining signal channel light input at signal input port 312 with the pump light, testing can be performed in conjunction with the signal light, independent of signal generation using a photon pair source. Accordingly, signal/pump wavelength demultiplexer 360 can be utilized in conjunction with signal input port 312 to provide a tap in for downstream optical components.

The output of signal/pump wavelength demultiplexer 360 can be directed to waveguide layers, which may be stacked layers in some embodiments. As illustrated in FIGS. 1 and 3, the output from pump preconditioning filter circuit 120 propagating in waveguide 362 is provided as an input to SFWM source 130.

It should be noted that although removal of light having a TM polarization is implemented using pump polarization band filter 320 and pump polarizing beam splitter filter 330, removal of light having a TM polarization can also be performed at other portions of the optical system, including other elements of notch filter circuit 100 that are polarization selective.

Referring once again to FIG. 3, pump light is output at pump output port 318. In operation, being able to characterize the pump light output at pump output port 318 enables pump light input at pump input port 316 to be polarized substantially in the TE polarization. Accordingly, second leg 324 of pump polarization band filter 320 is utilized to control the polarization state of pump light output at pump output port 318 and, consequently, the polarization state of pump light input at pump input port 316. As described more fully in relation to FIG. 4A, pump light propagating in waveguide 370 is received from first herald channel/pump rejection filter 430 and delivered to pump dump 142 illustrated in FIG. 1.

Figure 4B:
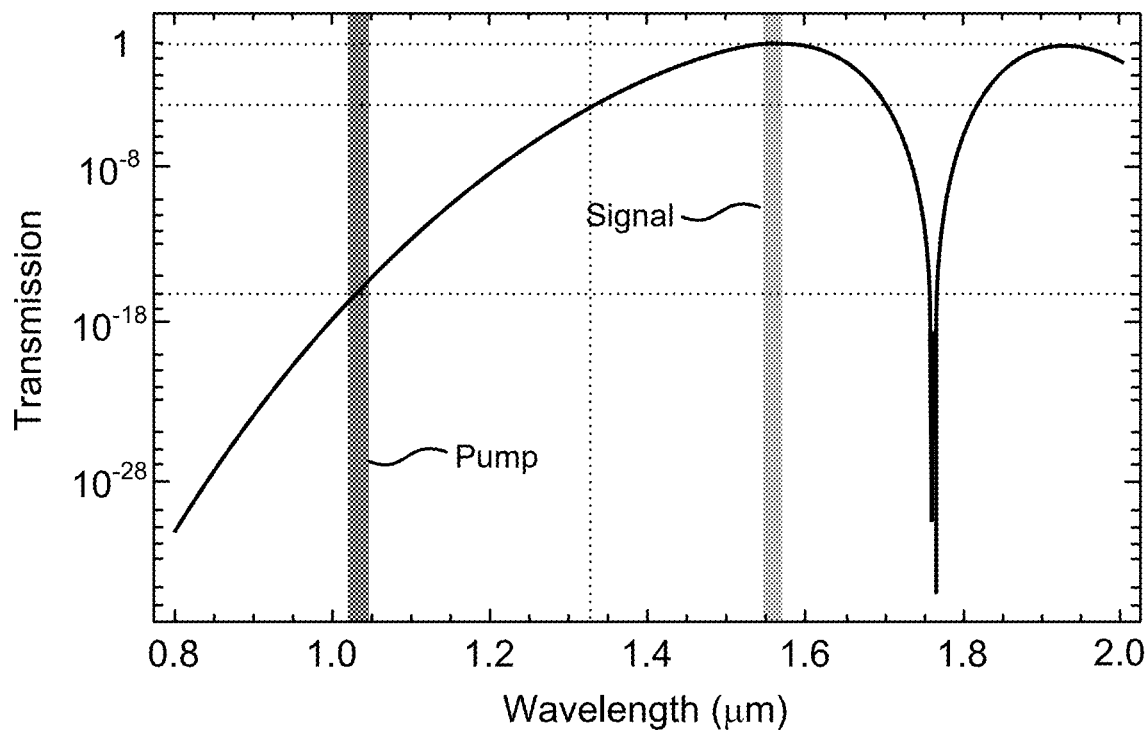
FIG. 4B is a plot illustrating the transmission profile for the primary wavelength demultiplexer filter and the signal channel pump rejection filter illustrated in FIG. 4A according to an embodiment of the present invention.
Figure 4C:
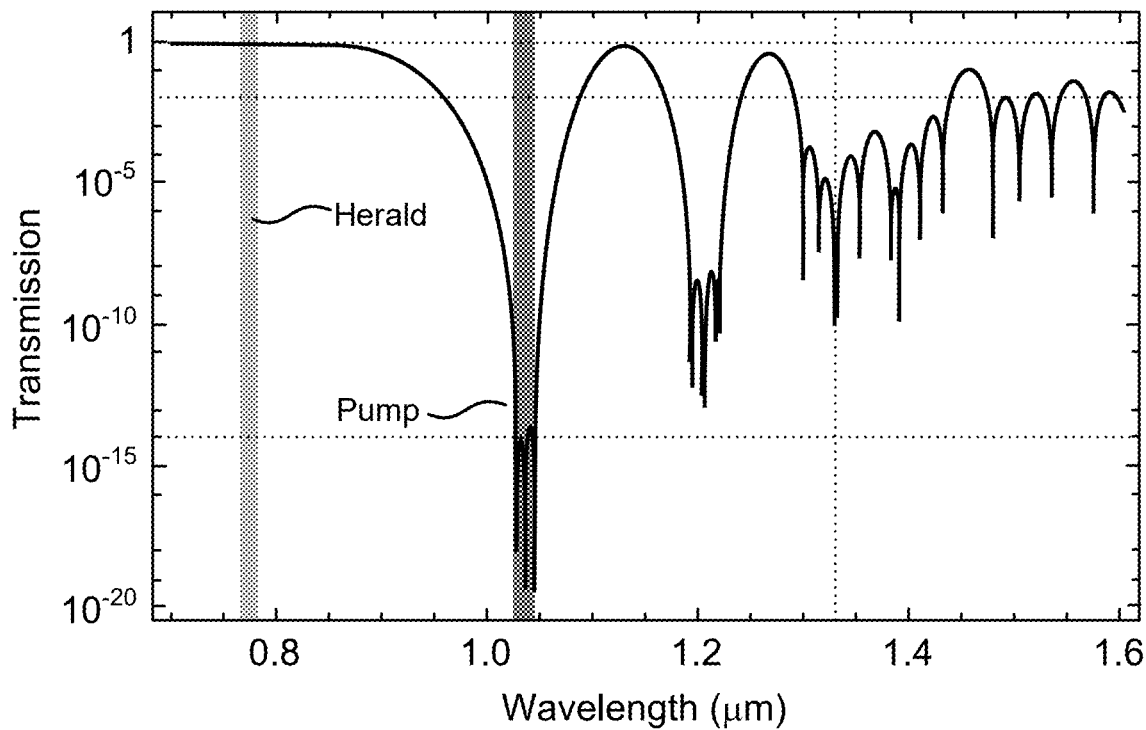
FIG. 4C is a plot illustrating the transmission profile for the primary wavelength demultiplexer filter and the herald channel pump rejection filter illustrated in FIG. 4A according to an embodiment of the present invention.

FIG. 4A is a simplified plan view diagram illustrating a primary wavelength demultiplexer filter, a signal channel pump rejection filter, and a herald channel pump rejection filter according to an embodiment of the present invention. As described more fully below, signal channel pump rejection filter 150 and herald channel pump rejection filter 160 include individual filters that operate as optical filters over predetermined wavelength ranges. FIG. 4B is a plot illustrating the transmission profile for the primary wavelength demultiplexer filter 140 and the signal channel pump rejection filter 150 and FIG. 4C is a plot illustrating the transmission profile for the primary wavelength demultiplexer filter 140 and the herald channel pump rejection filter 160.

As illustrated in FIG. 4A, primary wavelength demultiplexer filter 140 receives an input at waveguide 410 from SFWM source 130. The input includes the pump signal, the herald channel, and the signal channel. Primary wavelength demultiplexer filter 140 is optically coupled to first signal channel/pump rejection filter 420 and first herald channel/ pump rejection filter 430. Primary wavelength demultiplexer filter 140 is implemented in the illustrated embodiment as a WDM splitter that demultiplexes the signal channel and the herald channel. Primary wavelength demultiplexer filter 140 can be a 1×2 directional coupler that is coupled to a first waveguide optically coupled to first signal channel/pump rejection filter 420 and a second waveguide optically coupled to first herald channel/pump rejection filter 430. The 1×2 directional coupler can be implemented as evanescently coupled waveguides with predetermined lengths and lateral spacing. Thus, these two evanescently coupled waveguides separate the signal channel wavelengths and herald channel wavelengths and provide two outputs that are used as inputs for first signal channel/pump rejection filter 420 and first herald channel/pump rejection filter 430, respectively.

First signal channel/pump rejection filter 420 includes a set of 1×2 directional couplers 422 (e.g., two 1×2 directional couplers) that are each coupled to an output waveguide 424 and a filter waveguide 426. The 1×2 directional couplers can be implemented as evanescently coupled waveguides with predetermined lengths and lateral spacing. Pump light is filtered out with respect to the signal channel as the light propagates through the set of 1×2 directional couplers 422, with a portion of the pump light passing into the filter waveguide 426. Directional couplers can be dispersive, with the level of dispersion controlled, for example, via the length of the coupling region. One of ordinary skill in the art would recognize many variations, modifications, and alternatives. Light output from first signal channel/pump rejection filter 420 is input into second signal channel/pump rejection filter 440. Like first signal channel/pump rejection filter 420, second signal channel/pump rejection filter 440 includes a set of 1×2 directional couplers 442 (e.g., three 1×2 directional couplers) that are each coupled to an output waveguide 444 and a filter waveguide 446. Pump light is filtered out with respect to the signal channel as the light propagates through the set of 1×2 directional couplers 442, with a portion of the pump light passing into the filter waveguide 446. Accordingly, using first signal channel/pump rejection filter 420 and second signal channel/pump rejection filter 440, short wavelengths corresponding to the pump are separated from longer wavelengths corresponding to the signal channel.

In the embodiment illustrated in FIG. 4A, first signal channel/pump rejection filter 420 and second signal channel/pump rejection filter 440 are functionally similar to each other, but are defined in different layers (e.g., first signal channel/pump rejection filter 420 in defined in the WY layer and second signal channel/pump rejection filter 440 is defined in the WG layer). As illustrated in FIG. 4A, the use of two directional couplers in first signal channel/pump rejection filter 420 and three directional couplers in second signal channel/pump rejection filter 440 is merely exemplary as one implementation of a signal channel pump rejection filter and is not intended to limit the scope of the embodiments described herein. In other embodiments, the number of directional couplers is varied depending on the particular implementation, including the specific filter specifications. One of ordinary skill in the art would recognize many variations, modifications, and alternatives.

Thus, although two 1×2 directional couplers 442 are illustrated as components of first signal channel/pump rejection filter 420 and three 1×2 directional couplers 442 are illustrated as components of second signal channel/pump rejection filter 440, this particular implementation is merely exemplary and fewer or additional 1×2 directional couplers can be utilized in accordance with embodiments of the present invention. In addition to evanescently coupled directional couplers based on their dispersive nature, multimode interferometers (MMIs), adiabatic couplers, rapid adiabatic couplers, or the like can be utilized as components of the filters discussed herein.

FIG. 4B is a plot illustrating the transmission profile for the primary wavelength demultiplexer filter and the signal channel pump rejection filter illustrated in FIG. 4A according to an embodiment of the present invention. Referring to FIG. 4B, the signal channel at 1560 nm is characterized by a transmission value on the order of 1 while the pump at 1035 nm is characterized by a transmission value on the order of $10^{-16}$. Thus, the use of first signal channel/pump rejection filter 420 and second signal channel/pump rejection filter 440 enable a significant portion of the pump to be separated from the signal channel. In some embodiments, the bandwidth of the pump signal is on the order of 10-50 THz and the bandwidth of the signal channel is on the order of >800 GHz. Accordingly, the output at the output waveguide 444 of second signal channel/pump rejection filter 440 is predominantly the signal channel with a reduced pump signal as illustrated at the output of primary wavelength demultiplexer filter 140 directed to signal channel pump rejection filter 150 as illustrated in FIG. 1.

Referring once again to FIG. 4A, waveguide 410 is not only optically coupled to first signal channel/pump rejection filter 420, but also to first herald channel/pump rejection filter 430. First herald channel/pump rejection filter 430 includes a set of 1×2 directional couplers 432 (e.g., two 1×2 directional couplers) that are each coupled to an output waveguide 434 and either waveguide 370 or filter waveguide 436. Pump light is filtered out with respect to the herald channel as the light propagates through the set of 1×2 directional couplers 432, with a portion of the pump light passing into the waveguide 370 or filter waveguide 436. Light output from first herald channel/pump rejection filter 430 is input into second herald channel/pump rejection filter 450. Like first herald channel/pump rejection filter 430, second herald channel/pump rejection filter 450 includes a set of 1×2 directional couplers 452 (e.g., three 1×2 directional couplers) that are each coupled to an output waveguide 454 and a filter waveguide 456. Pump light is filtered out with respect to the herald channel as the light propagates through the set of 1×2 directional couplers 452, with a portion of the pump light passing into the filter waveguide 456. Accordingly, using first herald channel/pump rejection filter 430 and second herald channel/pump rejection filter 450, long wavelengths corresponding to the pump are separated from shorter wavelengths corresponding to the herald channel.

Although three 1×2 directional couplers 432 are illustrated as components of first herald channel/pump rejection filter 430 and three 1×2 directional couplers 452 are illustrated as components of second herald channel/pump rejection filter 450, this particular implementation is merely exemplary and fewer or additional 1×2 directional couplers can be utilized in accordance with embodiments of the present invention.

FIG. 4C is a plot illustrating the transmission profile for the primary wavelength demultiplexer filter and the herald channel pump rejection filter illustrated in FIG. 4A according to an embodiment of the present invention. Referring to FIG. 4C, the herald channel at 775 nm is characterized by a transmission value on the order of 1 while the pump at 1035 nm is characterized by a transmission value on the order of $10^{-14}$. Thus, the use of first herald channel/pump rejection filter 430 and second herald channel/pump rejection filter 450 enable a significant portion of the pump to be separated from the herald channel. In some embodiments, the bandwidth of the pump signal is on the order of 10-50 THz and the bandwidth of the herald channel is on the order of 200 GHz. Accordingly, the output at the output waveguide 454 of second herald channel/pump rejection filter 450 is predominantly the herald channel with a reduced pump signal as illustrated at the output of primary wavelength demultiplexer filter 140 directed to herald channel pump rejection filter 160 as illustrated in FIG. 1.

Figure 4D:
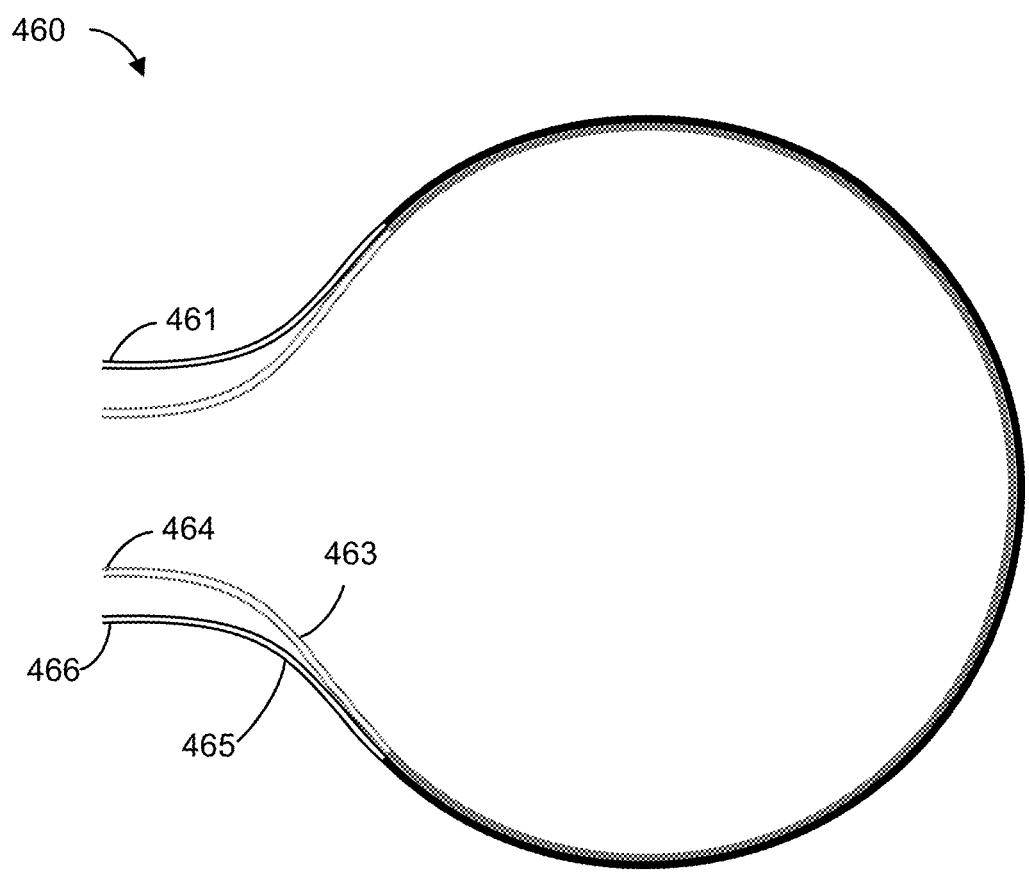
FIG. 4D is a simplified schematic diagram illustrating a phase-matching filter element according to an embodiment of the present invention.

FIG. 4D is a simplified schematic diagram illustrating a phase-matching filter element according to an embodiment of the present invention. In some embodiments, phase-matching filter element 460 is utilized in place of first signal channel/pump rejection filter 420 and/or second signal channel/pump rejection filter 440. Referring to FIG. 4D, phase-matching filter element 460 receives light at input port 461. The coupling between waveguides 463 and 465 as light propagates through phase-matching filter element 460 results in short wavelengths corresponding to the pump being separated from longer wavelengths corresponding to the signal channel. Accordingly, if signal channel light and pump light are input at input port 461, signal channel light can be output on waveguide 463 at output port 464 while pump light is output on waveguide 465 at output port 466 in a pass-through configuration or signal channel light can be output on waveguide 465 at output port 466 while pump light is output on waveguide 463 at output port 464 in a cross-over configuration. Thus, phase-matching filter element 460 can be utilized to provide the filtering functionality provided by first signal channel/pump rejection filter 420 and/or second signal channel/pump rejection filter 440.

In some embodiments, phase-matching filter element 460 can be utilized in place of first herald channel/pump rejection filter 430 and/or second herald channel/pump rejection filter 450. One of ordinary skill in the art would recognize many variations, modifications, and alternatives.

FIG. 5A is a simplified schematic diagram illustrating a signal channel broadband rejection filter according to an embodiment of the present invention. As illustrated in FIG. 5A, signal channel broadband rejection filter 152 utilizes N-stages (e.g., 5 stages in the illustrated embodiment) of asymmetric MZIs shown as first asymmetric Mach-Zehnder interferometer (MZI) 510, second asymmetric MZI 512, third asymmetric MZI 514, fourth asymmetric MZI 516, and fifth asymmetric MZI 518. The asymmetric MZIs are incoherently cascaded and utilize dispersive couplers as discussed in additional detail with respect to FIG. 5B. As described more fully herein, the use of asymmetric MZIs with non-uniform free spectral ranges (FSRs) enables narrow passband operation with a passband, for example, on the order of 2 nm.

First dispersive coupler 520 provides an input to first asymmetric MZI 510, the output of which is optically coupled to second dispersive coupler 521. An output of second dispersive coupler 521 is optically coupled to an input of third dispersive coupler 522. Third dispersive coupler 522 is optically coupled to provide an input to second asymmetric MZI 512, the output of which is optically coupled to fourth dispersive coupler 523. An output of fourth dispersive coupler 523 is optically coupled to an input of fifth dispersive coupler 524. Fifth dispersive coupler 524 is optically coupled to provide an input to third asymmetric MZI 514, the output of which is optically coupled to sixth dispersive coupler 525. An output of sixth dispersive coupler 525 is optically coupled to an input of seventh dispersive coupler 526. Seventh dispersive coupler 526 is optically coupled to provide an input to fourth asymmetric MZI 516, the output of which is optically coupled to eighth dispersive coupler 527. An output of eighth dispersive coupler 527 is optically coupled to an input of ninth dispersive coupler 528. Ninth dispersive coupler 528 is optically coupled to provide an input to fifth asymmetric MZI 518, the output of which is optically coupled to tenth dispersive coupler 529.

Signal channel broadband rejection filter 152 enables the portion of the spectrum at short wavelengths with respect to the signal wavelength to be removed or suppressed with respect to the signal channel.

In the embodiment illustrated in FIG. 5A, first asymmetric MZI 510 has a free spectral range (FSR) of 65 nm, second asymmetric MZI 512 has an FSR of 52 nm, third asymmetric MZI 514 has an FSR of 39 nm, fourth asymmetric MZI 516 has an FSR of 26 nm, and fifth asymmetric MZI 518 has an FSR of 13 nm. Thus, in this embodiment, the FSR decreases (e.g., monotonically) as a function of position along the chain of asymmetric MZIs. In addition to tunable asymmetric MZIs, other embodiments utilize a plurality of asymmetric MZI that are not tunable. As an example, 7 non-tunable asymmetric MZIs can be utilized in the signal channel broadband rejection filter 152. In this example, the non-tunable asymmetric MZIs can have FSR values of 42.46 nm, 27.54 nm, 21.50 nm, 13.09 nm, 8.42 nm, 5.73 nm, and 3.75 nm.

FIG. 5B is a simplified schematic diagram of a first asymmetric MZI as illustrated in FIG. 5A according to an embodiment of the present invention. Referring to FIG. 5B, first asymmetric MZI 510 includes first dispersive coupler 520 optically coupled to first arm 511 and second arm 513. First arm 511 can implement a first predetermined phase shift using index variation module 531, for example, a heater, driven by electrical leads 532 and 533. Second arm 513 can implement a second predetermined phase shift using index variation module 535, for example, a heater, driven by electrical leads 536 and 537. Light propagating out of first arm 511 and second arm 513 is received at second dispersive coupler 521, which serves as an input to third dispersive coupler 522 optically coupled to second asymmetric MZI 512 illustrated in FIG. 5A. Accordingly, the 5-stages of asymmetric MZIs illustrated in FIG. 5A are coupled to a first dispersive coupler optically coupled to first asymmetric MZI 510, a set of two dispersive couplers disposed between each of the second asymmetric MZI, the third asymmetric MZI, the fourth asymmetric MZI, and the fifth asymmetric MZI, and a tenth dispersive coupler disposed after the fifth asymmetric MZI. In an embodiment, four of the dispersive couplers, for example, third dispersive coupler 522, fourth dispersive coupler 523, seventh dispersive coupler 526, and eighth dispersive coupler 527, are characterized by a length equal to $\pi/4\Delta\beta$ and six of the dispersive couplers, for example, first dispersive coupler 520, second dispersive coupler 521, fifth dispersive coupler 524, sixth dispersive coupler 525, ninth dispersive coupler 528, and tenth dispersive coupler 529, are characterized by a length equal to $5\pi/4\Delta\beta$, where $\Delta\beta$ is the waveguide dispersion of the dispersive coupler. In another embodiment, all ten of the dispersive couplers are characterized by a length equal to $\pi/4\Delta\beta$. One of ordinary skill in the art would recognize many variations, modifications, and alternatives.

FIG. 5C is a plot illustrating the transmission profile for filter designs including the signal channel broadband rejection filter illustrated in FIG. 5A according to an embodiment of the present invention. Referring to FIG. 5C, BB corresponds to a broadband filter utilizing a first set of three coupled WDMs with a first waveguide thickness (WY) and a second set of three coupled WDMs with a second waveguide thickness (WG). Typically, the first set of WDMs is implemented in a first layer of a stack and the second set of WDMs is implemented in a second layer of the stack, with the first layer and the second layer having differing thicknesses. As an example, referring to FIG. 4A, the first set of three coupled WDMs could be similar to 1×2 directional couplers 422 of first signal channel/pump rejection filter 420 and the second set of three coupled WDMs could be similar to 1×2 directional couplers 442 of second signal channel/pump rejection filter 440.

The remaining transmission profiles correspond to a filter circuit including a BB filter and 5 asymmetric MZIs coupled together using different types of dispersive couplers. The combination of a BB filter with 5 asymmetric MZIs coupled to adjacent asymmetric MZIs using wavelength insensitive rapid adiabatic couplers (RACs), labeled as BB+5×RAC, produces the transmission profile illustrated by the short-dashed line. If the RACs are replaced by 10 direction couplers coupling the 5 asymmetric MZIs as discussed in relation to FIG. 5A, each of the 10 directional couplers being characterized by a phase shift equal to $\pi/4$, the transmission profile illustrated by the dotted line is produced (labeled as BB+5×DC–$\pi/4$). If, instead of using direction couplers characterized by the same phase shift of $\pi/4$, 4 directional couplers, each characterized by a phase shift equal to $\pi/4$, and 6 directional couplers, each characterized by a phase shift equal to $5\pi/4$, are utilized to couple two of the asymmetric MZIs to adjacent asymmetric MZIs and three of the asymmetric MZIs, respectively, the transmission profile illustrated by the solid line is produced (labeled as BB+2×DC–$\pi/4$+3×DC–$5\pi/4$).

In summary, the dotted line (BB+5×DC–$\pi/4$) corresponds to all ten of the dispersive couplers illustrated in FIG. 5A being characterized by a length equal to $\pi/4\Delta\beta$. The solid line (BB+2×DC–$\pi/4$+3×DC–$5\pi/4$) corresponds to four of the dispersive couplers being characterized by a length equal to $\pi/4\Delta\beta$ and six of the dispersive couplers being characterized by a length equal to $5\pi/4\Delta\beta$.

FIG. 5D is a plot illustrating a magnified portion of the transmission profile illustrated in FIG. 5C for the signal channel broadband rejection filter illustrated in FIG. 5A. As illustrated in FIG. 5D, which shows transmission profiles in the vicinity of the signal channel (e.g., in the vicinity of 1560 nm), using four dispersive couplers characterized by a length equal to $\pi/4\Delta\beta$ and six dispersive couplers characterized by a length equal to $5\pi/4\Delta\beta$, the transmission profile illustrated by the solid line can be produced, providing both broadband filtering as illustrated in FIG. 5C and narrow band filtering at the signal channel wavelength of 1560 nm. Thus, the signal channel can be passed using a filter network including primary wavelength demultiplexer filter 140, signal channel pump rejection filter 150, and signal channel broadband rejection filter 152.

FIG. 5E is a simplified schematic diagram illustrating a signal channel notch filter according to an embodiment of the present invention. The signal channel, as well as remaining pump light, is received from signal channel broadband rejection filter 152 illustrated in FIG. 5A. Referring to FIGS. 5A and 5E, the last directional coupler of signal channel broadband rejection filter 152 (e.g., tenth dispersive coupler 529) is illustrated as input port 551 of signal channel notch filter 154. One output of input port 551 is directed to waveguide 552 and the other output is directed to waveguide 553 leading to signal channel ring notch filter 550, which can also be referred to as a phase-matching filter. Electrical leads 559 are provided to provide tuning signals to signal channel ring notch filter 550. Signal channel ring notch filter 550 passes the signal channel at the signal channel wavelength (e.g., 1560 nm) and couples out signal band resonances produced by the source. As illustrated in FIG. 2, signal band resonances on either side of the signal channel wavelength S, particularly, signal band resonance on the short wavelength side of signal channel wavelength S, are filtered out using signal channel ring notch filter 550.

Referring to FIG. 5E, the signal channel at the signal channel wavelength is output from signal channel ring notch filter 550 on waveguide 554 and signal band resonances produced by the source are output on waveguide 555, which operates as a light dump. Signal channel polarization filter 556, which includes three 90° bends in waveguide 554 (e.g., bends 557A, 557B, and 557C) filters out signal channel light having a TM polarization, providing the desired signal channel at the signal channel wavelength on waveguide 558.

Figure 5F:
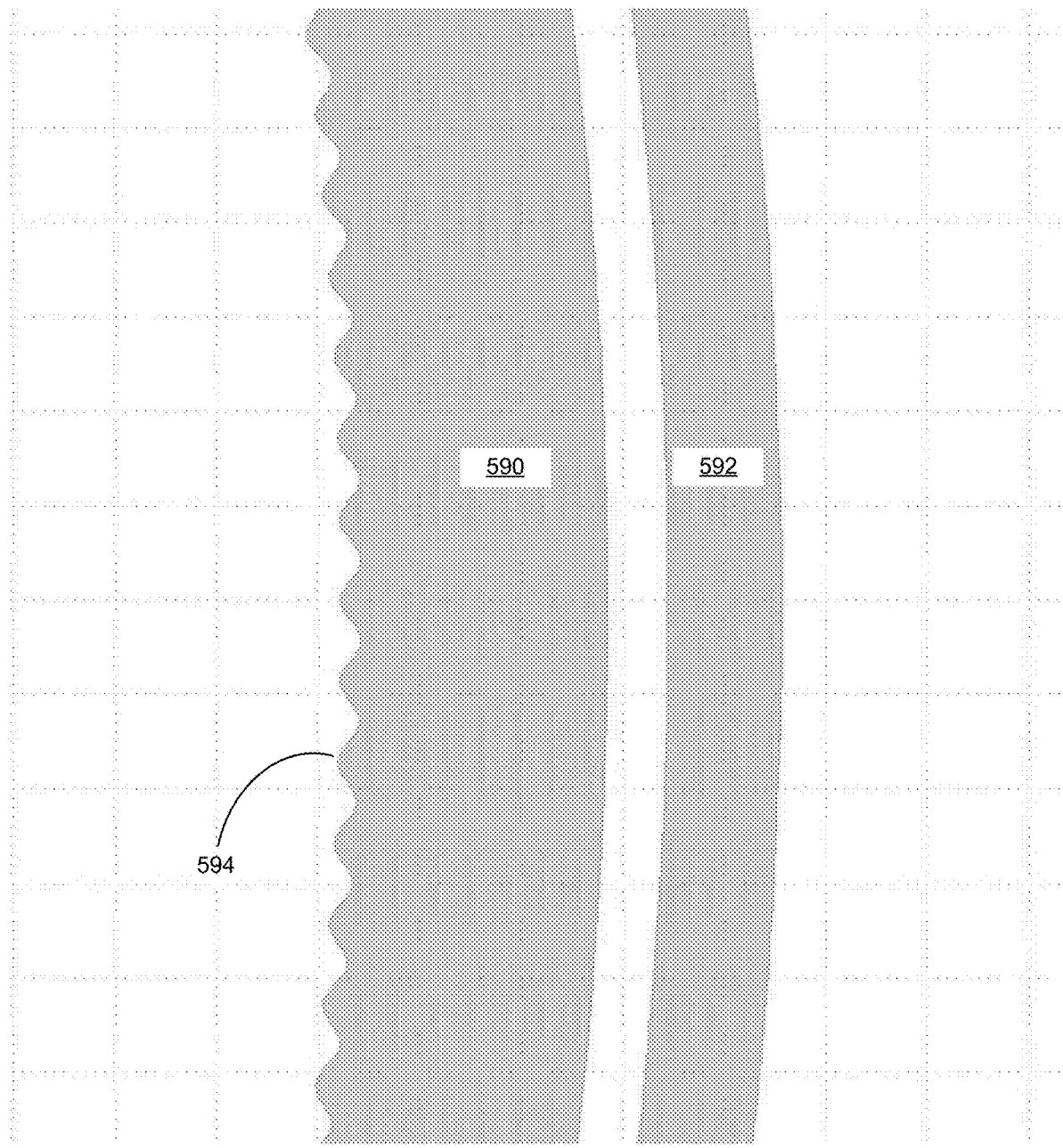
FIG. 5F is a simplified schematic diagram illustrating a corrugated ring implemented in the phase-matching filter element illustrated in FIG. 5E.

FIG. 5F is a simplified schematic diagram illustrating a corrugated ring implemented in the signal channel ring notch filter 550 illustrated in FIG. 5E. As illustrated in FIG. 5F, the inner surface or wall of ring 590 of signal channel ring notch filter 550 includes a Bragg corrugation 594 that has been added along the inner surface or wall of ring 590. As a result, the signal resonance and/or the herald resonance (if a Bragg corrugation is formed on the inner surface of wall of the ring of herald channel ring notch filter 650 discussed in relation to FIG. 6A) can be split, thereby preventing that specific wavelength from coupling from waveguide 592 to ring 590, while the other sidebands of the source couple into ring 590 and are attenuated by the loss of ring 590. Referring to FIGS. 5E and 5F, waveguides 553 and 554 can correspond to waveguide 592 and the ring of signal channel ring notch filter 550 can correspond to ring 590.

FIG. 6A is a simplified schematic diagram illustrating a herald channel notch filter according to an embodiment of the present invention. Herald channel notch filter 162 shares common elements with signal channel broadband rejection filter 152 illustrated in FIG. 5A and the description provided in relation to FIGS. 5A and 5B is applicable to herald channel notch filter 162 as appropriate.

Herald channel notch filter 162 utilizes N-stages (e.g., 5 stages in the illustrated embodiment) of asymmetric Mach-Zehnder Interferometers (MZIs) shown as first asymmetric MZI 610, second asymmetric MZI 612, third asymmetric MZI 614, fourth asymmetric MZI 616, and fifth asymmetric MZI 618. The asymmetric MZIs are incoherently cascaded and utilize dispersive couplers as was discussed in relation to FIG. 5B. As described more fully herein, the use of asymmetric MZIs with non-uniform free spectral ranges (FSRs) enables narrow passband operation with a passband on the order of 2 nm.

First dispersive coupler 620 provides an input to first asymmetric MZI 610, the output of which is optically coupled to second dispersive coupler 621. An output of second dispersive coupler 621 is optically coupled to an input of third dispersive coupler 622. Third dispersive coupler 622 is optically coupled to provide an input to second asymmetric MZI 612, the output of which is optically coupled to fourth dispersive coupler 623. An output of fourth dispersive coupler 623 is optically coupled to an input of fifth dispersive coupler 624. Fifth dispersive coupler 624 is optically coupled to provide an input to third asymmetric MZI 614, the output of which is optically coupled to sixth dispersive coupler 625. An output of sixth dispersive coupler 625 is optically coupled to an input of seventh dispersive coupler 626. Seventh dispersive coupler 626 is optically coupled to provide an input to fourth asymmetric MZI 616, the output of which is optically coupled to eighth dispersive coupler 627. An output of eighth dispersive coupler 627 is optically coupled to an input of ninth dispersive coupler 628. Ninth dispersive coupler 628 is optically coupled to provide an input to fifth asymmetric MZI 618, the output of which is optically coupled to tenth dispersive coupler 629.

Herald channel notch filter 162 enables the portion of the spectrum at long wavelengths with respect to the herald wavelength to be removed or suppressed with respect to the herald channel.

In the embodiment illustrated in FIG. 6A, first asymmetric MZI 610 has a free spectral range (FSR) of 16 nm, second asymmetric MZI 612 has an FSR of 12.8 nm, third asymmetric MZI 614 has an FSR of 9.6 nm, fourth asymmetric MZI 616 has an FSR of 6.4 nm, and fifth asymmetric MZI 618 has an FSR of 3.2 nm. Thus, in this embodiment, the FSR decreases (e.g., monotonically) as a function of position along the chain of asymmetric MZIs. In addition to tunable asymmetric MZIs, other embodiments utilize a plurality of asymmetric MZI, that are not tunable. As an example, 7 non-tunable asymmetric MZIs can be utilized in the herald channel notch filter 162. In this example, the non-tunable asymmetric MZIs can have FSR values of 40 nm, 30 nm, 20 nm, 12.5 nm, 7.5 nm, 5 nm, and 5 nm.

In comparison with the asymmetric MZIs utilized in signal channel broadband rejection filter 152, the asymmetric MZIs utilized in herald channel notch filter 162 can have different waveguide widths and different coupler designs based on different evanescent waveguide widths, different gaps between evanescent waveguides, and/or different evanescent waveguide lengths. As a result, the wavelength bands filtered by signal channel broadband rejection filter 152 and herald channel notch filter 162 will differ. One of ordinary skill in the art would recognize many variations, modifications, and alternatives.

Referring once again to FIG. 6A, the herald channel, as well as remaining pump light, is received from the last directional coupler of herald channel notch filter 162 (e.g., tenth dispersive coupler 629) on waveguide 630, which provides an input to herald channel polarization filter 640. Herald channel polarization filter 640 is implemented as a series of serpentine waveguide bends in the illustrated embodiment and herald light having a transverse magnetic field (TM) polarization, as well as long wavelength light, is removed. The output of herald channel polarization filter 640 is provided on waveguide 651, which is coupled to herald channel ring notch filter 650, which can also be referred to as a phase-matching filter. Electrical leads 659 are provided to provide tuning signals to herald channel ring notch filter 650. Herald channel ring notch filter 650 passes the herald channel at the herald channel wavelength (e.g., 775 nm) and couples out herald band resonances produced by the source. As illustrated in FIG. 2, herald band resonances on either side of the herald channel wavelength H, particularly, herald band resonance on the long wavelength side of herald channel wavelength H, are filtered out using herald channel ring notch filter 650.

Referring to FIG. 6A, the herald channel at the herald channel wavelength is output from herald channel ring notch filter 650 on waveguide 652 and herald band resonances produced by the source are output on waveguide 653, which operates as a light dump.

Figure 6B:
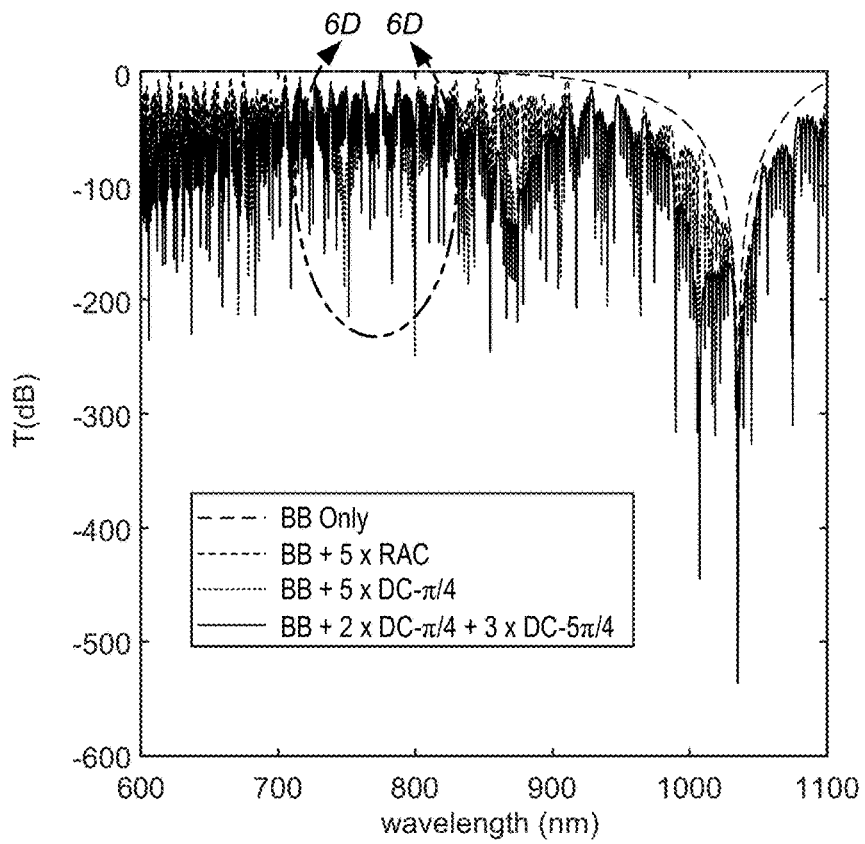
FIG. 6B is a plot illustrating the transmission profile for filter designs including the herald channel broadband rejection filter illustrated in FIG. 6A according to an embodiment of the present invention.

FIG. 6B is a plot illustrating the transmission profile for filter designs including the herald channel broadband rejection filter illustrated in FIG. 6A according to an embodiment of the present invention. Referring to FIG. 6B, BB corresponds to a broadband filter utilizing a first set of three coupled WDMs with a first waveguide thickness (WY) and a second set of three coupled WDMs with a second waveguide thickness (WG). As an example, referring to FIG. 4A, the first set of three coupled WDMs could be similar to 1×2 directional couplers 432 of first herald channel/pump rejection filter 430 and the second set of three coupled WDMs could be similar to 1×2 directional couplers 452 of second herald channel/pump rejection filter 450.

The remaining transmission profiles correspond to a filter circuit including a BB filter and 5 asymmetric MZIs coupled together using different types of dispersive couplers. The combination of a BB filter with 5 asymmetric MZIs coupled to adjacent asymmetric MZIs using wavelength insensitive rapid adiabatic couplers (RACs), labeled as BB+5×RAC, produces the transmission profile illustrated by the short-dashed line. If the RACs are replaced by 10 direction couplers coupling the 5 asymmetric MZIs as discussed in relation to FIG. 6A, each of the 10 directional couplers being characterized by a phase shift equal to π/4, the transmission profile illustrated by the dotted line is produced (labeled as BB+5×DC−π/4). If, instead of using direction couplers characterized by the same phase shift of π/4, 4 directional couplers, each characterized by a phase shift equal to π/4, and 6 directional couplers, each characterized by a phase shift equal to 5π/4, are utilized to couple two of the asymmetric MZIs to adjacent asymmetric MZIs and three of the asymmetric MZIs, respectively, the transmission profile illustrated by the solid line is produced (labeled as BB+2× DC−π/4+3×DC−5π/4).

In summary, the dotted line (BB+5×DC−π/4) corresponds to all ten of the dispersive couplers illustrated in FIG. 6A being characterized by a length equal to π/4Δβ. The solid line (BB+2×DC−π/4+3×DC−5π/4) corresponds to four of the dispersive couplers being characterized by a length equal to π/4Δβ and six of the dispersive couplers being characterized by a length equal to 5π/4Δβ.

Figure 6C:
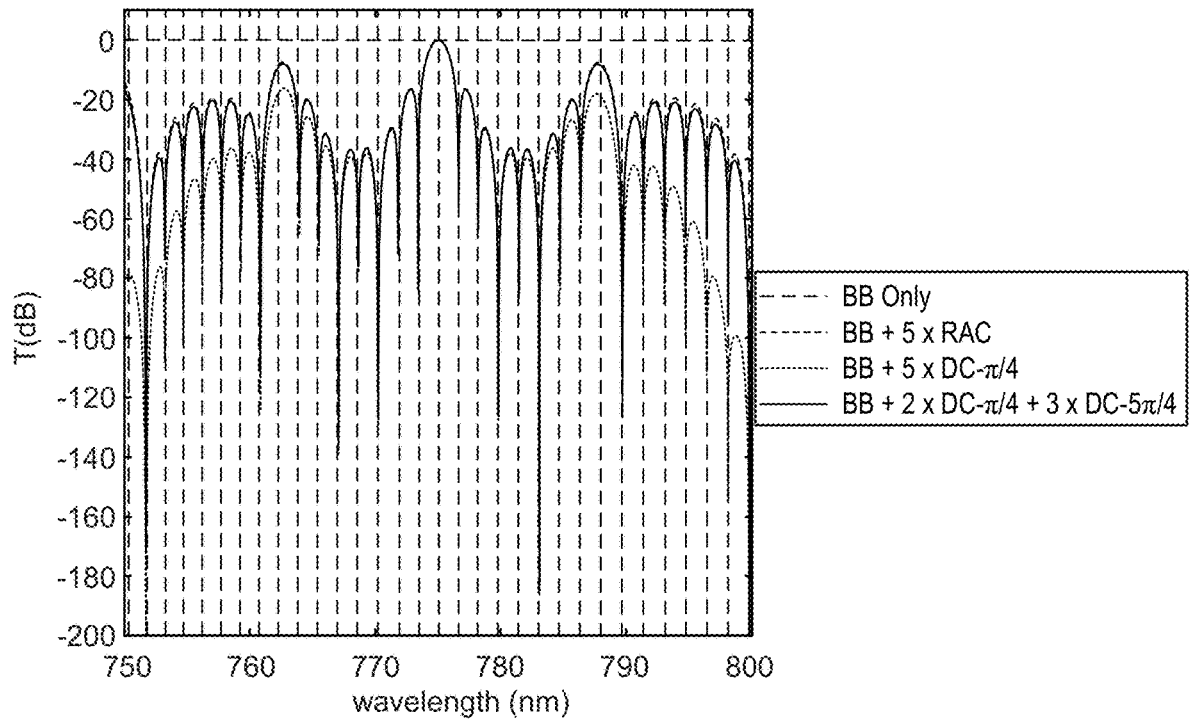
FIG. 6C is a plot illustrating a magnified portion of the transmission profile illustrated in FIG. 6B for the herald channel broadband rejection filter illustrated in FIG. 6A.

FIG. 6C is a plot illustrating a magnified portion of the transmission profile illustrated in FIG. 6B for the herald channel broadband rejection filter illustrated in FIG. 6A. As illustrated in FIG. 6C, which shows transmission profiles in the vicinity of the herald channel (e.g., in the vicinity of 775 nm), using four dispersive couplers characterized by a length equal to π/4Δβ and six dispersive couplers characterized by a length equal to 5π/4Δβ, the transmission profile illustrated by the solid line can be produced, providing narrow band filtering at the herald channel wavelength of 775 nm. Thus, the herald channel can be passed using a filter network including primary wavelength demultiplexer filter 140, herald channel pump rejection filter 160, and herald channel notch filter 162.

Figure 7:
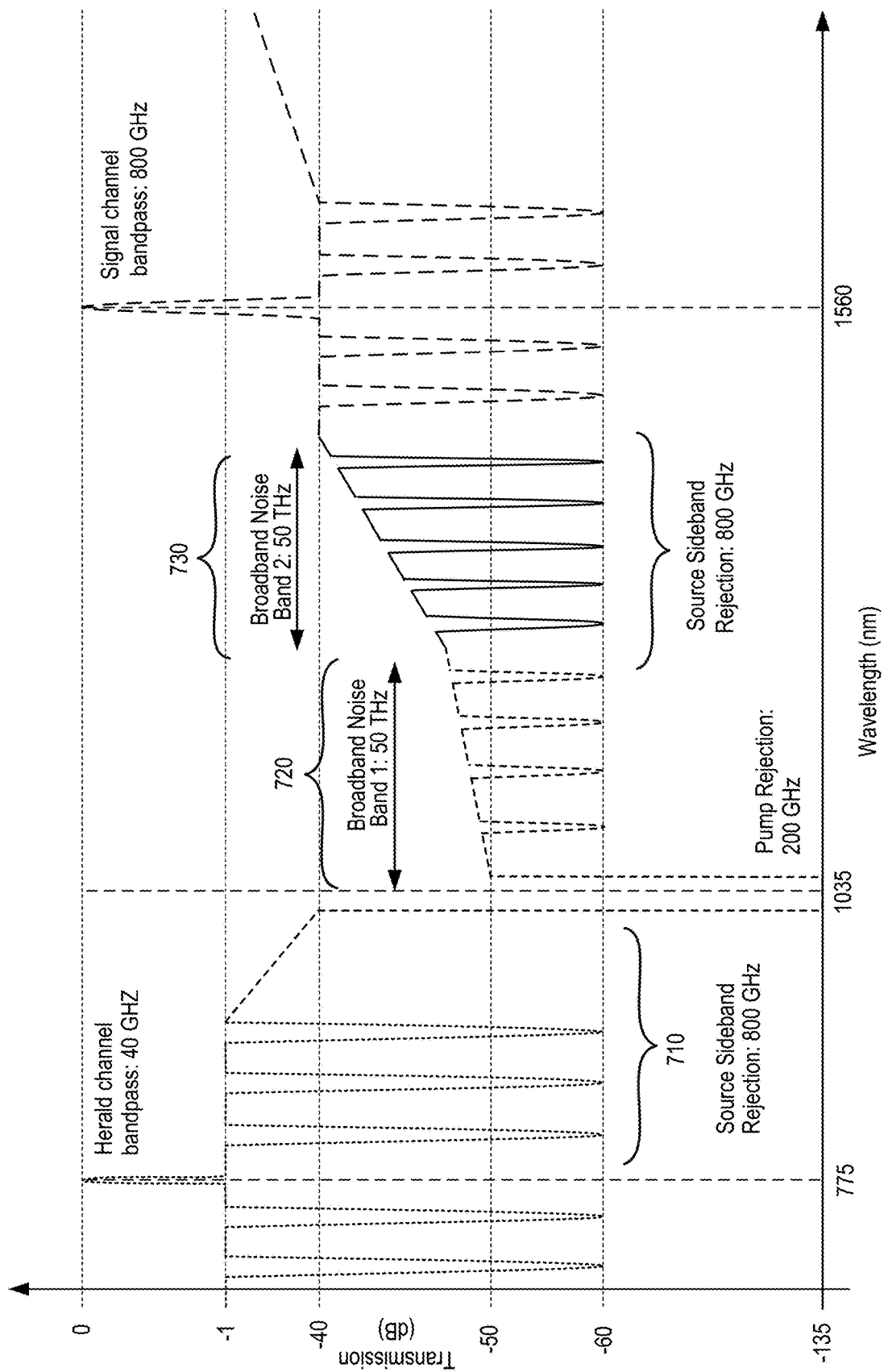
FIG. 7 is a plot illustrating the transmission profile for the notch filter circuit illustrated in FIG. 1 according to an embodiment of the present invention.

FIG. 7 is a plot illustrating the transmission profile for the notch filter circuit 100 illustrated in FIG. 1 according to an embodiment of the present invention. As illustrated in FIG. 7, the total response of the notch filter circuit 100, which includes a number of component filters as illustrated in FIG. 1, provides a 2 nm bandpass over a wavelength range from 600 nm to 2 µm. Referring to FIG. 7, the spectral filtering properties of each of the components of the notch filter circuit are illustrated. Pump rejection is illustrated over a range of 200 GHz at a wavelength of 1035 nm, with a depth of rejection of 135 dB. A herald channel bandpass of 40 GHz, produced using herald channel notch filter 162, is illustrated. Herald resonances, with a spacing of 800 GHz between resonances, are illustrated in region 710, with filtering of the herald resonances produced using herald channel notch filter 162. Filtering of broadband noise band 1 in region 720, with a bandwidth of 50 THz, and broadband noise band 2 in region 730, with a bandwidth of 50 THz, are illustrated, with the filtering effect produced using signal channel broadband rejection filter 152 decreasing as the wavelength increases with respect to the pump wavelength of 1035 nm. The spacing of 800 GHz between signal resonances in region 720 and region 730 is illustrated. Signal channel bandpass of 800 GHz, produced using signal channel broadband rejection filter 152 and signal channel notch filter 154, is also illustrated.

Figure 8:
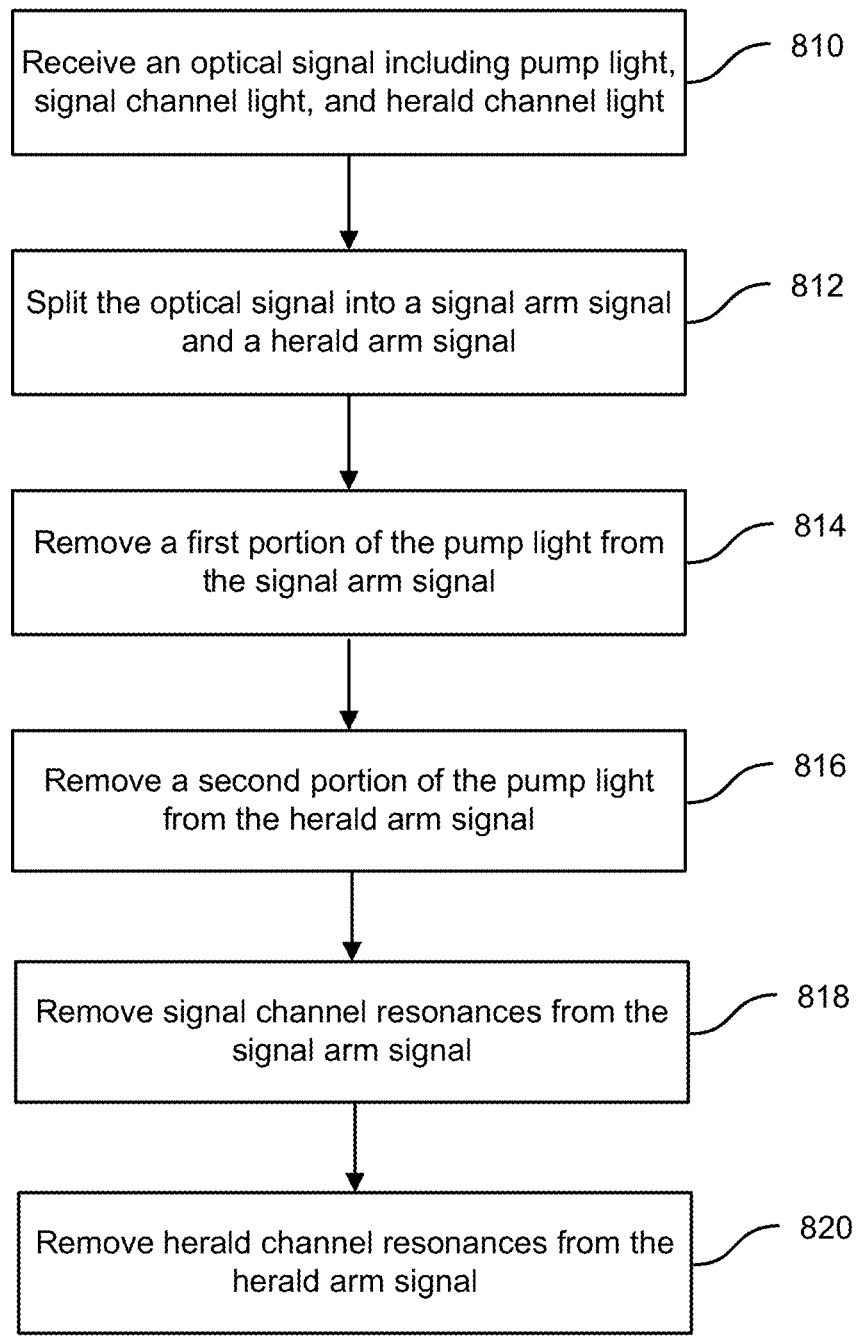
FIG. 8 is a simplified flowchart illustrating a method of operating a notch filter circuit according to an embodiment of the present invention.

FIG. 8 is a simplified flowchart illustrating a method of operating a notch filter circuit according to an embodiment of the present invention. The method can include spectrally filtering an optical signal produced by a spontaneous four-wave mixing, single photon source. The method includes receiving the optical signal (810). The optical signal includes pump light, signal channel light, and herald channel light. The pump light can be characterized by a pump wavelength, the signal channel light can be characterized by a signal wavelength, and the herald channel light can be characterized by a herald wavelength. The pump wavelength can be between the herald wavelength and the signal wavelength.

The method also includes splitting the optical signal into a signal arm signal and a herald arm signal (812), removing a first portion of the pump light from the signal arm signal (814) and removing a second portion of the pump light from the herald arm signal (816). Splitting the optical signal into a signal arm signal and a herald arm signal can include passing the optical signal through a wavelength demultiplexer and demultiplexing the signal channel light and the herald channel light. In some embodiments, after splitting the optical signal into a signal arm signal and a herald arm signal, the method can further include removing additional pump light from the signal channel light. Removing the first portion of the pump light from the signal arm signal can include passing the signal arm signal through a series of directional couplers. Removing the second portion of the pump light from the herald arm signal can include passing the herald arm signal through a series of directional couplers. The method further includes removing signal channel resonances from the signal arm signal (818) and removing herald channel resonances from the herald arm signal (820).

It should be appreciated that the specific steps illustrated in FIG. 8 provide a particular method of operating a notch filter circuit according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Although embodiments of the present invention have been described with respect to photonic quantum computing systems, the notch filter circuit described herein, which is characterized by a narrow passband with high suppression, fabrication-tolerant features, and low loss can be utilized in applications currently using ring-based filters and Bragg grating filters. Thus, embodiments of the present invention are applicable to a wide variety of applications including the area of telecommunications, data-centers, optical communications, artificial intelligence (AI) hardware, LIDAR, and other optical sensing applications.

The features described can be implemented in digital electronic circuitry, or in computer hardware, in firmware, in software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the disclosure have been described. Nevertheless, it will be understood that various modifications may be made without departing from the scope of the disclosure.

What is claimed is:

1. A notch filter circuit comprising:
   a wavelength demultiplexer;
   a first pump rejection filter coupled to the wavelength demultiplexer;
   a second pump rejection filter coupled to the wavelength demultiplexer;
   a first notch filter arm coupled to the first pump rejection filter and including a first chain of asymmetric Mach-Zehnder interferometers (MZIs); and
   a second notch filter arm coupled to the second pump rejection filter and including a second chain of asymmetric MZIs.

2. The notch filter circuit of claim 1 wherein the first pump rejection filter comprises:
   a first spectral filter including a series of directional couplers; and
   a second spectral filter optically coupled to the first spectral filter.

3. The notch filter circuit of claim 2 wherein the first chain of asymmetric MZIs is optically coupled to the second spectral filter.

4. The notch filter circuit of claim 2 wherein the series of directional couplers comprises a set of 1×2 directional couplers.

5. The notch filter circuit of claim 4 wherein:
   the first spectral filter includes two 1×2 directional couplers; and
   the second spectral filter includes three 1×2 directional couplers.

6. The notch filter circuit of claim 2 wherein the first notch filter arm further comprises a ring notch filter.

7. The notch filter circuit of claim 1 wherein each of the asymmetric MZIs in the first chain of asymmetric MZIs is characterized by a free spectral range different from the free spectral range of others of the asymmetric MZIs in the first chain of asymmetric MZIs.

8. The notch filter circuit of claim 7 wherein the free spectral range characterizing each of the asymmetric MZIs in the first chain of asymmetric MZIs decreases monotonically from a first asymmetric MZI of the asymmetric MZIs in the first chain of asymmetric MZIs to a last asymmetric MZI of the asymmetric MZIs in the first chain of asymmetric MZIs.

9. The notch filter circuit of claim 1 wherein each of the asymmetric MZIs in the first chain of asymmetric MZIs is joined to adjacent asymmetric MZIs of the asymmetric MZIs in the first chain of asymmetric MZIs using a set of dispersive couplers.

10. The notch filter circuit of claim 9 wherein a length of a first plurality of the set of dispersive couplers is equal to $\pi/4\Delta\beta$ and wherein a length of a second plurality of the set of dispersive couplers is equal to $5\pi/4\Delta\beta$, wherein $\Delta\beta$ is a waveguide dispersion of each of the dispersive couplers.

11. The notch filter circuit of claim 1 wherein the second pump rejection filter comprises:
   a first spectral filter including a series of directional couplers; and
   a second spectral filter optically coupled to the first spectral filter.

12. The notch filter circuit of claim 11 wherein the second chain of asymmetric MZIs is optically coupled to the second spectral filter.

13. The notch filter circuit of claim 11 wherein the series of directional couplers comprises a set of 1×2 directional couplers.

14. The notch filter circuit of claim 13 wherein:
   the first spectral filter includes three 1×2 directional couplers; and
   the second spectral filter includes three 1×2 directional couplers.

15. The notch filter circuit of claim 11 wherein the second notch filter arm further comprises a ring notch filter.

16. The notch filter circuit of claim 11 wherein each of the asymmetric MZIs in the second chain of asymmetric MZIs is characterized by a free spectral range different from the free spectral range of others of the asymmetric MZIs in the second chain of asymmetric MZIs.

17. The notch filter circuit of claim 16 wherein the free spectral range characterizing each of the asymmetric MZIs in the second chain of asymmetric MZIs decreases monotonically from a first asymmetric MZI of the asymmetric MZIs in the second chain of asymmetric MZIs to a last asymmetric MZI of the asymmetric MZIs in the second chain of asymmetric MZIs.

18. The notch filter circuit of claim 11 wherein each of the asymmetric MZIs in the second chain of asymmetric MZIs is joined to adjacent asymmetric MZIs of the asymmetric MZIs in the second chain of asymmetric MZIs using a set of dispersive couplers.

19. The notch filter circuit of claim 18 wherein a length of a first plurality of the set of dispersive couplers is equal to $\pi/4\Delta\beta$, wherein $\Delta\beta$ is a waveguide dispersion of the each of the dispersive couplers.

20. The notch filter circuit of claim 19 wherein a length of a second plurality of the set of dispersive couplers is equal to $5\pi/4\Delta\beta$, wherein $\Delta\beta$ is a waveguide dispersion of each of the dispersive couplers.

* * * * *